US012712633B2

(12) United States Patent
Wei et al.

(10) Patent No.: US 12,712,633 B2
(45) Date of Patent: Aug. 18, 2026

(54) DATA TRANSMISSION METHOD, RADIO FREQUENCY UNIT, BASEBAND UNIT, AND COMMUNICATION SYSTEM

(71) Applicant: HUAWEI TECHNOLOGIES CO., LTD., Shenzhen (CN)

(72) Inventors: Juan Wei, Shanghai (CN); Yannian Lou, Shanghai (CN); Kang Xiao, Nanjing (CN); Dongsheng Zheng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 343 days.

(21) Appl. No.: 18/504,180

(22) Filed: Nov. 8, 2023

(65) Prior Publication Data

US 2024/0072896 A1 Feb. 29, 2024

Related U.S. Application Data

(63) Continuation of application No. PCT/CN2022/125706, filed on Oct. 17, 2022.

(30) Foreign Application Priority Data

Dec. 30, 2021 (CN) ......................... 202111651822.2

(51) Int. Cl.
*H04B 10/2575* (2013.01)
*H04J 14/02* (2006.01)

(52) U.S. Cl.
CPC ...... *H04B 10/2575* (2013.01); *H04J 14/0205* (2013.01)

(58) Field of Classification Search
None
See application file for complete search history.

(56) References Cited

U.S. PATENT DOCUMENTS

2009/0274462 A1 11/2009 Yu
2015/0010307 A1 1/2015 Zhong et al.
2016/0337041 A1* 11/2016 Wen .................. H04B 10/2575

FOREIGN PATENT DOCUMENTS

CN 102215606 A 10/2011
CN 103107851 A 5/2013
(Continued)

OTHER PUBLICATIONS

Varghese Antony Thomas et al: "A Full-Duplex Diversity-Assisted Hybrid Analogue/Digitized Radio Over Fibre for Optical/Wireless Integration", IEEE Communications Letters. IEEE Service Center Piscataway, NJ, US, vol. 17, No. 2, Feb. 1, 2013 (Feb. 1, 2013), pp. 409-412, XP011495448.

(Continued)

*Primary Examiner* — David W Lambert

(57) ABSTRACT

This application provides a data transmission method, a radio frequency unit, a baseband unit, and a communication system. The baseband unit includes: a multi-wavelength integrated light source, configured to generate a first optical carrier and a second optical carrier that have different wavelengths; a first modulator, configured to modulate downlink data sent to the first radio frequency unit to the first optical carrier, to obtain a first downlink optical signal; a second modulator, configured to modulate downlink data sent to the second radio frequency unit to the second optical carrier, to obtain a second downlink optical signal; and a multiplexer/demultiplexer, configured to multiplex the first downlink optical signal and the second downlink optical signal into a downlink combined optical signal and send the downlink combined optical signal.

7 Claims, 17 Drawing Sheets

(56) References Cited

FOREIGN PATENT DOCUMENTS

| | | | |
|---|---|---|---|
| CN | 114466085 | A | 5/2022 |
| JP | 2003124893 | A | 4/2003 |
| JP | 2006262020 | A | 9/2006 |
| JP | 2010245987 | A | 10/2010 |
| JP | 2020150316 | A | 9/2020 |

OTHER PUBLICATIONS

Xu Z et al: "WDM-PON Architectures With a Single Shared Interferometric Filter for Carrier-Reuse Upstream Transmission", Journal of Lightwave Technology, IEEE. USA vol. 25, No. 12, Dec. 1, 2007 (Dec. 1, 2007), pp. 3669-3677, XP001545401.

* cited by examiner

Multiplexer/ Demultiplexer

Optical circulator

Site side

CONT. FROM FIG. 7A $\lambda_1$ $\lambda_1$ Optical module Radio frequency unit 1

$\lambda_2$ $\lambda_2$ Optical module Radio frequency unit 2

$\lambda_n$ $\lambda_n$ Optical module Radio frequency unit n

Downlink data $\lambda_n$ Photoelectric detector TIA $\lambda_n$ Modulator

Driver Uplink data

DATA TRANSMISSION METHOD, RADIO FREQUENCY UNIT, BASEBAND UNIT, AND COMMUNICATION SYSTEM

CROSS-REFERENCE TO RELATED APPLICATIONS

This application is a continuation of International Application No. PCT/CN2022/125706, filed on Oct. 17, 2022, which claims priority to earlier Chinese Patent Application No. 202111651822.2, filed on Dec. 30, 2021. The disclosures of the aforementioned applications are hereby incorporated by reference in their entireties.

TECHNICAL FIELD

Embodiments of this application relate to the field of communication technologies, and in particular, to a data transmission method, a radio frequency unit, a baseband unit, and a communication system.

BACKGROUND

With the increase of wireless communication frequency bands, radio frequency units (such as remote radio units (RRU) or active antenna units (AAU)) of a same site continuously increase, and pre-embedded fronthaul optical fiber resources are very limited. Therefore, it is required to use a wavelength division multiplexing technology to implement data transmission between one baseband unit and a plurality of radio frequency modules in one optical fiber.

To implement the data transmission between the one baseband unit and the plurality of radio frequency modules, a possible implementation solution is: a plurality of independent optical modules are disposed in the baseband unit, each optical module includes a light source, and each optical module corresponds to one radio frequency unit. The light source generates an optical carrier with a fixed wavelength, and the optical carrier is used for carrying data sent to a corresponding radio frequency unit. Therefore, a quantity of optical modules in the baseband unit is equal to a quantity of radio frequency units.

SUMMARY

Embodiments of this application provide a data transmission method, a radio frequency unit, a baseband unit, and a communication system, so as to reduce operation and maintenance costs of the baseband unit.

According to a first aspect, an embodiment of this application provides a baseband unit, including: a multi-wavelength integrated light source, configured to generate a first optical carrier and a second optical carrier that have different wavelengths; a first modulator, configured to modulate downlink data sent to a first radio frequency unit to the first optical carrier, to obtain a first downlink optical signal; a second modulator, configured to modulate downlink data sent to a second radio frequency unit to the second optical carrier, to obtain a second downlink optical signal; and a multiplexer/demultiplexer, configured to multiplex the first downlink optical signal and the second downlink optical signal into a downlink combined optical signal, and send the downlink combined optical signal.

According to the foregoing solution, each optical module in the baseband unit is deconstructed, and the multi-wavelength integrated light source is disposed in the baseband unit. The multi-wavelength integrated light source can provide optical carriers that have a plurality of different wavelengths, and reduce a quantity of independent light sources in the baseband unit. This helps multi-channel modulator in the baseband unit be integrated on a monolithic, saves an area occupied by separate encapsulation of each optical module, greatly reduces a size, and increases a quantity of optical fiber interfaces that can be supported by the baseband unit. Therefore, device costs, fronthaul operation and maintenance costs, and complexity of the baseband unit are reduced.

In a possible implementation, the multi-wavelength integrated light source is further configured to generate a third optical carrier and a fourth optical carrier that have different wavelengths, where the third optical carrier is different from both the first optical carrier and the second optical carrier, and the fourth optical carrier is different from both the first optical carrier and the second optical carrier. The multiplexer/demultiplexer is further configured to multiplex the third optical carrier and the fourth optical carrier into the downlink combined optical signal; and receive a first uplink combined optical signal and demultiplex the first uplink combined optical signal into a first uplink optical signal and a second uplink optical signal, where the first uplink optical signal is obtained by modulating uplink data that is from the first radio frequency unit to the baseband unit to the third optical carrier, and the second uplink optical signal is obtained by modulating uplink data that is from the second radio frequency unit to the baseband unit to the fourth optical carrier.

In the foregoing solution, because a baseband unit on an equipment room side provides an optical carrier for an optical module of a radio frequency unit on a site side, it is beneficial to reduce a quantity of optical modules in the radio frequency unit or even not need an independent light source, and the following advantages are provided: (1) Costs in the optical module of the radio frequency unit may be reduced, and power consumption required by the optical module to stabilize a light source wavelength may be reduced. (2) Unified scheduling and management may be implemented to avoid service interruption caused by a conflict between a wavelength of an optical module used by a newly powered-on radio frequency unit and a wavelength of a working optical module, thereby implementing intelligent operation and maintenance. (3) Optical modules in different radio frequency units on the site side have a same model, and wavelengths do not need to be distinguished, which facilitates maintenance and installation.

In a possible implementation, the downlink combined optical signal and the first uplink combined optical signal are transmitted in a same optical fiber.

In the foregoing solution, an uplink signal and a downlink signal are transmitted in a same optical fiber, which helps save optical fiber resources.

In a possible implementation, the downlink combined optical signal and the first uplink combined optical signal are transmitted in two different optical fibers.

In the foregoing solution, an uplink signal and a downlink signal are transmitted in different optical fibers, which helps avoid mutual interference between the uplink signal and the downlink signal.

In a possible implementation, the multiplexer/demultiplexer is further configured to receive a second uplink combined optical signal and demultiplex the second uplink combined optical signal into a third uplink optical signal and a fourth uplink optical signal, where the third uplink optical signal is obtained by modulating uplink data that is from the first radio frequency unit to the baseband unit to the first optical carrier, and the fourth uplink optical signal is obtained by modulating uplink data that is from the second radio frequency unit to the baseband unit to the second optical carrier.

In the foregoing solution, because the optical module in the radio frequency unit on the site side provides an optical carrier for the optical module of the radio frequency unit by the baseband unit on the equipment room side, it is beneficial to reduce a quantity of optical modules in the radio frequency unit or even not need an independent light source, and the following advantages are provided: (1) Costs in the optical module of the radio frequency unit may be reduced, and power consumption required by the optical module to stabilize a light source wavelength may be reduced. (2) Unified scheduling and management may be implemented to avoid service interruption caused by a conflict between a wavelength of an optical module used by a newly powered-on radio frequency unit and a wavelength of a working optical module, thereby implementing intelligent operation and maintenance. (3) Optical modules in different radio frequency units on the site side have a same model, and wavelengths do not need to be distinguished, which facilitates maintenance and installation. In addition, downlink data sent by the baseband unit to a radio frequency unit and uplink data sent by the radio frequency unit to the baseband unit are carried in an optical carrier having a same wavelength for transmission, which is beneficial to saving optical carrier resources.

In a possible implementation, the downlink combined optical signal and the second uplink combined optical signal are transmitted in a same optical fiber; or the downlink combined optical signal and the second uplink combined optical signal are transmitted in two different optical fibers.

According to a second aspect, an embodiment of this application provides a radio frequency unit, including an input/output interface and a modulator. The input/output interface is configured to receive an optical carrier from a baseband unit. The modulator is configured to modulate uplink data sent to the baseband unit to the optical carrier, to obtain an uplink optical signal. The input/output interface is further configured to send the uplink optical signal to the baseband unit.

In the foregoing solution, because the baseband unit on the equipment room side provides an optical carrier for the optical module of the radio frequency unit on the site side, it is beneficial to reduce a quantity of optical modules in the radio frequency unit or even not need an independent light source, and the following advantages are provided: (1) Costs in the optical module of the radio frequency unit may be reduced, and power consumption required by the optical module to stabilize a light source wavelength may be reduced. (2) Unified scheduling and management may be implemented to avoid service interruption caused by a conflict between a wavelength of an optical module used by a newly powered-on radio frequency unit and a wavelength of a working optical module, thereby implementing intelligent operation and maintenance. (3) Optical modules in different radio frequency units on the site side have a same model, and wavelengths do not need to be distinguished, which facilitates maintenance and installation.

In a possible implementation, the optical carrier and the uplink optical signal are transmitted in a same optical fiber.

In a possible implementation, the optical carrier and the uplink optical signal are transmitted in two different optical fibers.

According to a third aspect, an embodiment of this application provides a radio frequency unit, including an input/output interface and a modulator. The input/output interface is configured to receive a downlink optical signal from a baseband unit. The modulator is configured to recover an optical carrier based on the downlink optical signal, and modulate uplink data sent to the baseband unit to the optical carrier, to obtain an uplink optical signal. The input/output interface is further configured to send the uplink optical signal to the baseband unit.

In the foregoing solution, because the baseband unit on the equipment room side provides an optical carrier for the optical module of the radio frequency unit on the site side, it is beneficial to reduce a quantity of optical modules in the radio frequency unit or even not need an independent light source, and the following advantages are provided: (1) Costs in the optical module of the radio frequency unit may be reduced, and power consumption required by the optical module to stabilize a light source wavelength may be reduced. (2) Unified scheduling and management may be implemented to avoid service interruption caused by a conflict between a wavelength of an optical module used by a newly powered-on radio frequency unit and a wavelength of a working optical module, thereby implementing intelligent operation and maintenance. (3) Optical modules in different radio frequency units on the site side have a same model, and wavelengths do not need to be distinguished, which facilitates maintenance and installation. In addition, downlink data sent by the baseband unit to a radio frequency unit and uplink data sent by the radio frequency unit to the baseband unit are carried in an optical carrier having a same wavelength for transmission, which is beneficial to saving optical carrier resources.

In a possible implementation, the downlink optical signal and the uplink optical signal are transmitted in a same optical fiber.

In the foregoing solution, an uplink signal and a downlink signal are transmitted in a same optical fiber, which helps save optical fiber resources.

In a possible implementation, the downlink optical signal and the uplink optical signal are transmitted in two different optical fibers.

In the foregoing solution, an uplink signal and a downlink signal are transmitted in different optical fibers, which helps avoid mutual interference between the uplink signal and the downlink signal.

According to a fourth aspect, an embodiment of this application provides a communication system, including a baseband unit, a first radio frequency unit, and a second radio frequency unit. The baseband unit is configured to generate a first optical carrier, a second optical carrier, a third optical carrier, and a fourth optical carrier that have different wavelengths; modulate downlink data sent to the first radio frequency unit to the first optical carrier, to obtain a first downlink optical signal; modulate downlink data sent to the second radio frequency unit to the second optical carrier, to obtain a second downlink optical signal; and multiplex the first downlink optical signal, the second downlink optical signal, the third optical carrier, and the fourth optical carrier into a downlink combined optical signal, and send the downlink combined optical signal. The first radio frequency unit is configured to receive the first downlink optical signal and the third optical carrier, and obtain the downlink data sent to the first radio frequency unit from the first downlink optical signal; modulate uplink data sent to the baseband unit to the third optical carrier, to obtain a first uplink optical signal; and send the first uplink optical signal to the baseband unit. The second radio frequency unit is configured to receive the second downlink optical signal and the fourth optical carrier, and obtain the downlink data sent to the second radio frequency unit from the second downlink optical signal; modulate the uplink data sent to the baseband unit to the fourth optical carrier, to obtain a second uplink optical signal; and send the second uplink optical signal to the baseband unit. The baseband unit is further configured to receive an uplink combined optical signal, and demultiplex the uplink combined optical signal into the first uplink optical signal and the second uplink optical signal.

In a possible implementation, the downlink combined optical signal and the uplink combined optical signal are transmitted in a same optical fiber; or the downlink combined optical signal and the uplink combined optical signal are transmitted in two different optical fibers.

According to a fifth aspect, an embodiment of this application provides a communication system, including a baseband unit, a first radio frequency unit, and a second radio frequency unit. The baseband unit is configured to generate a first optical carrier and a second optical carrier that have different wavelengths; modulate downlink data sent to the first radio frequency unit to the first optical carrier, to obtain a first downlink optical signal; modulate downlink data sent to the second radio frequency unit to the second optical carrier, to obtain a second downlink optical signal; and multiplex the first downlink optical signal and the second downlink optical signal into a downlink combined optical signal, and send the downlink combined optical signal. The first radio frequency unit is configured to receive the first downlink optical signal, and obtain the downlink data sent to the first radio frequency unit from the first downlink optical signal; recover the first optical carrier based on the first downlink optical signal, and modulate uplink data sent to the baseband unit to the first optical carrier, to obtain a first uplink optical signal; and send the first uplink optical signal to the baseband unit. The second radio frequency unit is configured to receive the second downlink optical signal, and obtain the downlink data sent to the second radio frequency unit from the second downlink optical signal; recover the second optical carrier based on the second downlink optical signal, and modulate uplink data sent to the baseband unit to the second optical carrier, to obtain a second uplink optical signal; and send the second uplink optical signal to the baseband unit. The baseband unit is further configured to receive an uplink combined optical signal, and demultiplex the uplink combined optical signal into the first uplink optical signal and the second uplink optical signal.

In a possible implementation, the downlink combined optical signal and the uplink combined optical signal are transmitted in a same optical fiber; or the downlink combined optical signal and the uplink combined optical signal are transmitted in two different optical fibers.

According to a sixth aspect, an embodiment of this application provides a communication system, including a first radio frequency unit, a second radio frequency unit, and any baseband unit in the first aspect. The first radio frequency unit is configured to receive a first downlink optical signal. The second radio frequency unit is configured to receive a second downlink optical signal.

According to a seventh aspect, an embodiment of this application provides a communication system, including a baseband unit and any radio frequency unit in the second aspect. The baseband unit is configured to send an optical carrier to the radio frequency unit.

According to an eighth aspect, an embodiment of this application provides a communication system, including a baseband unit and any radio frequency unit in the third aspect. The baseband unit is configured to send a downlink optical signal to the radio frequency unit.

According to a ninth aspect, an embodiment of this application provides a data transmission method. The method includes: A baseband unit generates a first optical carrier, a second optical carrier, a third optical carrier, and a fourth optical carrier that have different wavelengths. The baseband unit modulates downlink data sent to a first radio frequency unit to the first optical carrier, to obtain a first downlink optical signal. The baseband unit modulates downlink data sent to a second radio frequency unit to the second optical carrier, to obtain a second downlink optical signal. The baseband unit multiplexes the first downlink optical signal, the second downlink optical signal, the third optical carrier, and the fourth optical carrier into a downlink combined optical signal, and sends the downlink combined optical signal. The first radio frequency unit receives the first downlink optical signal and the third optical carrier. The first radio frequency unit obtains the downlink data sent to the first radio frequency unit from the first downlink optical signal. The first radio frequency unit modulates uplink data sent to the baseband unit to the third optical carrier, to obtain a first uplink optical signal. The first radio frequency unit sends the first uplink optical signal to the baseband unit. The second radio frequency unit receives the second downlink optical signal and the fourth optical carrier. The second radio frequency unit obtains the downlink data sent to the second radio frequency unit from the second downlink optical signal. The second radio frequency unit modulates the uplink data sent to the baseband unit to the fourth optical carrier, to obtain a second uplink optical signal. The second radio frequency unit sends the second uplink optical signal to the baseband unit. The baseband unit receives an uplink combined optical signal. The baseband unit demultiplexes the uplink combined optical signal into the first uplink optical signal and the second uplink optical signal.

In a possible implementation, the downlink combined optical signal and the uplink combined optical signal are transmitted in a same optical fiber; or the downlink combined optical signal and the uplink combined optical signal are transmitted in two different optical fibers.

According to a tenth aspect, an embodiment of this application provides a data transmission method. The method includes: A baseband unit generates a first optical carrier and a second optical carrier that have different wavelengths. The baseband unit modulates downlink data sent to a first radio frequency unit to the first optical carrier, to obtain a first downlink optical signal. The baseband unit modulates downlink data sent to a second radio frequency unit to the second optical carrier, to obtain a second downlink optical signal. The baseband unit multiplexes the first downlink optical signal and the second downlink optical signal into a downlink combined optical signal, and sends the downlink combined optical signal. The first radio frequency unit receives the first downlink optical signal. The first radio frequency unit obtains the downlink data sent to the first radio frequency unit from the first downlink optical signal. The first radio frequency unit recovers the first optical carrier based on the first downlink optical signal. The first radio frequency unit modulates uplink data sent to the baseband unit to the first optical carrier, to obtain a first uplink optical signal. The first radio frequency unit sends the first uplink optical signal to the baseband unit. The second radio frequency unit receives the second downlink optical signal. The second radio frequency unit obtains the downlink data sent to the second radio frequency unit from the second downlink optical signal. The second radio frequency unit recovers the second optical carrier based on the second downlink optical signal. The second radio frequency unit modulates the uplink data sent to the baseband unit to the second optical carrier, to obtain a second uplink optical signal. The second radio frequency unit sends the second uplink optical signal to the baseband unit. The baseband unit receives an uplink combined optical signal. The baseband unit demultiplexes the uplink combined optical signal into the first uplink optical signal and the second uplink optical signal.

In a possible implementation, the downlink combined optical signal and the uplink combined optical signal are transmitted in a same optical fiber; or the downlink combined optical signal and the uplink combined optical signal are transmitted in two different optical fibers.

According to an eleventh aspect, an embodiment of this application provides a baseband unit, including a processor and an interface circuit. The processor is configured to communicate with another apparatus through the interface circuit, and is configured to implement functions of the first modulator, the second modulator, and the multiplexer/demultiplexer in any baseband unit in the first aspect. There are one or more processors.

According to a twelfth aspect, an embodiment of this application provides a radio frequency unit, including a processor and an interface circuit. The processor is configured to communicate with another apparatus through the interface circuit, and is configured to implement a function of the modulator in the radio frequency unit in the second aspect. The interface circuit is configured to implement a function of the input/output interface in the radio frequency unit in the second aspect. There are one or more processors.

According to a thirteenth aspect, an embodiment of this application provides a radio frequency unit, including a processor and an interface circuit. The processor is configured to communicate with another apparatus through the interface circuit, and is configured to implement a function of the modulator in the radio frequency unit in the third aspect. The interface circuit is configured to implement a function of the input/output interface in the radio frequency unit in the third aspect. There are one or more processors.

BRIEF DESCRIPTION OF DRAWINGS

FIG. 3(*b*)-1, FIG. 3(*b*)-2, and FIG. 3(*b*)-3 are a schematic flowchart of a data transmission method according to an embodiment of this application;

FIG. 3(*c*)-1, FIG. 3(*c*)-2, and FIG. 3(*c*)-3 are a schematic flowchart of a data transmission method according to an embodiment of this application;

DESCRIPTION OF EMBODIMENTS

Figure 1:
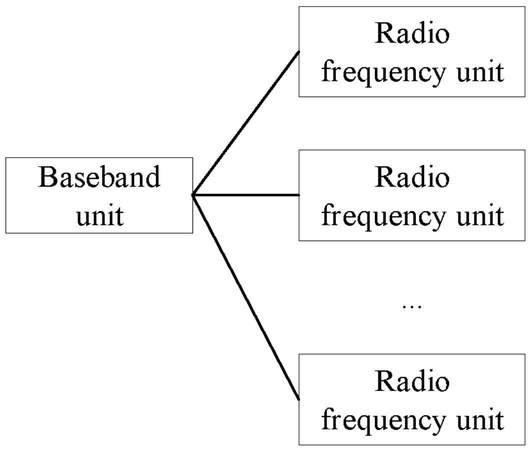
FIG. 1 is a schematic diagram of a communication system to which an embodiment of this application is applicable.

FIG. 1 is a schematic diagram of a communication system to which an embodiment of this application is applicable. The communication system includes a baseband unit (BBU) and one or more radio frequency units (RU) having a communication connection relationship with the baseband unit. The baseband unit is a communication device or a functional module having a baseband signal processing function. The radio frequency unit is a communication device or a functional module having a function of processing an intermediate frequency signal, a radio frequency signal, or an intermediate radio frequency signal. The radio frequency unit may be, for example, an AAU or an RRU. An interface between the baseband unit and the radio frequency unit may be a common public radio interface (CPRI), an enhanced common public radio interface (eCPRI), or another interface type, which is not limited in embodiments of this application. The baseband unit may be disposed in an equipment room. Therefore, the baseband unit is also referred to as the baseband unit in the equipment room. The radio frequency unit is often disposed outside the equipment room and is also referred to as the radio frequency unit on a site side.

Figure 2:
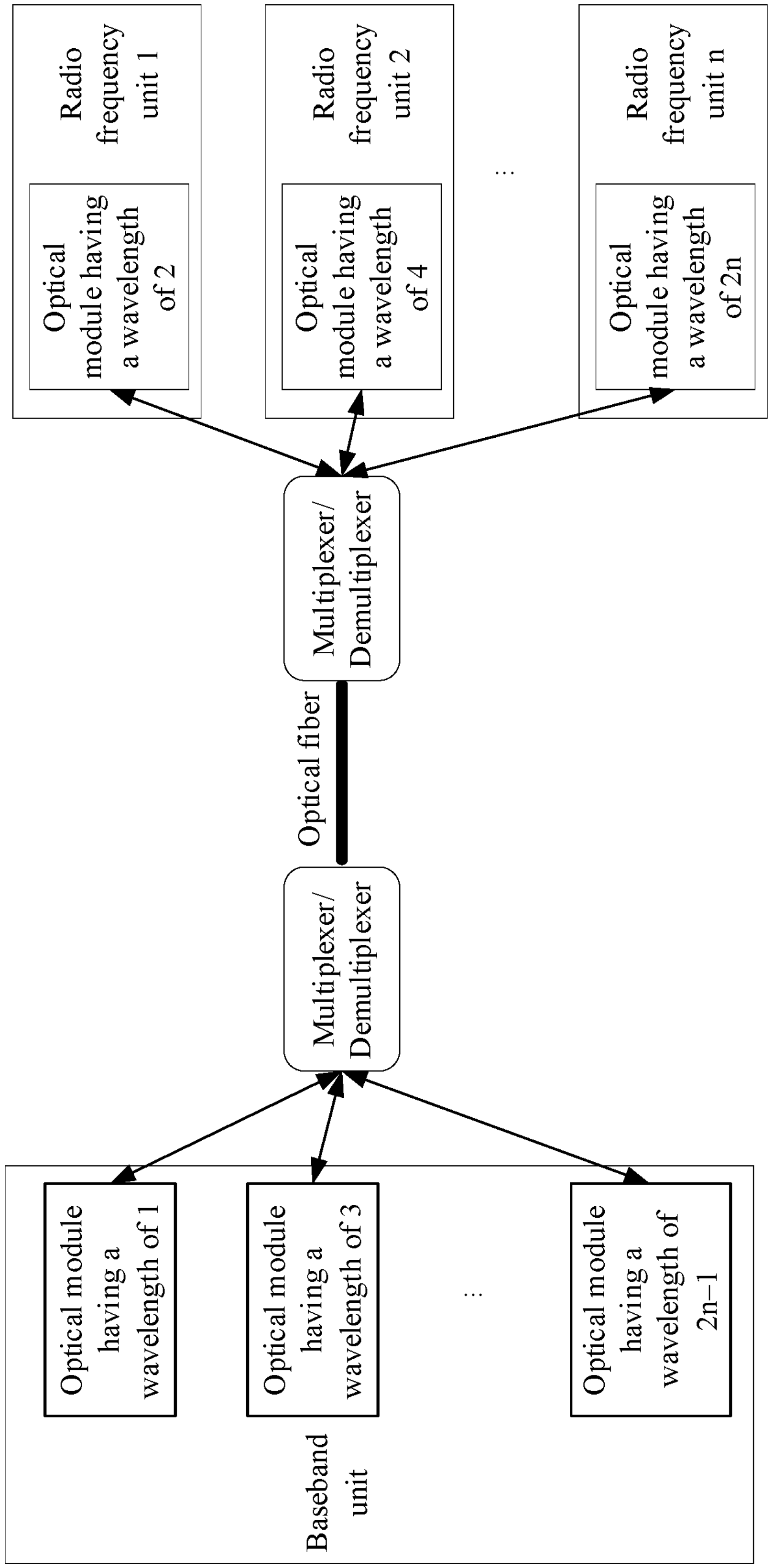
FIG. 2 is a schematic diagram of a fronthaul wavelength division multiplexing system according to an embodiment of this application.

FIG. 2 is a schematic diagram of a fronthaul wavelength division multiplexing system according to an embodiment of this application. One baseband unit is communicatively connected to n radio frequency units, where n is an integer greater than 1.

In independent optical modules are disposed in the baseband unit. Different optical modules generate optical carriers that have different wavelengths. An optical module having a wavelength of 1 in the baseband unit generates an optical carrier having a wavelength of $\lambda_1$, an optical module having a wavelength of 3 generates an optical carrier having a wavelength of $\lambda_3$, and by analogy, an optical module having a wavelength of 2n−1 generates an optical carrier having a wavelength of $\lambda_{2n-1}$. Each optical module in the baseband unit corresponds to one radio frequency unit, and different optical modules correspond to different radio frequency units. One optical module is disposed in each radio frequency unit, and the one optical module may generate an optical carrier with a fixed wavelength. Optical modules of different radio frequency units generate optical carriers that have different wavelengths. For example, an optical module having a wavelength of 2 of a radio frequency unit 1 generates an optical carrier having a wavelength of $\lambda_2$, an optical module having a wavelength of 4 of a radio frequency unit 2 generates an optical carrier having a wavelength of $\lambda_4$, and by analogy, an optical module having a wavelength of 2n of a radio frequency unit n generates an optical carrier having a wavelength of $\lambda_{2n}$.

Each optical module includes a light source, a driver, a photoelectric detector, and a transimpedance amplifier (TIA). The driver is configured to drive the light source to generate an optical carrier with a fixed wavelength, and load data onto the optical carrier, to obtain an optical signal. The photoelectric detector is configured to convert the optical signal into an electrical signal. The TIA is configured to amplify the electrical signal.

In a downlink direction, a light source in an optical module having a wavelength of 1 generates an optical carrier having a wavelength of $\lambda_1$, and then modulates downlink data 1 that needs to be sent to the radio frequency unit 1 to the optical carrier, to obtain a downlink optical signal 1. A light source in an optical module having a wavelength of 3 generates an optical carrier having a wavelength of $\lambda_3$, and then modulates downlink data 2 that needs to be sent to the radio frequency unit 2 to the optical carrier, to obtain a downlink optical signal 2. By analogy, a light source in an optical module having a wavelength of 2n−1 generates an optical carrier having a wavelength of $\lambda_{2n-1}$, and then modulates downlink data n that needs to be sent to the radio frequency unit n to the optical carrier, to obtain a downlink optical signal n. Then, a multiplexer (Mux) of the baseband unit multiplexes the n downlink optical signals to obtain a downlink combined optical signal, and sends the downlink combined optical signal to a site side through an optical fiber. A demultiplexer (DeMux) on the site side demultiplexes the downlink combined optical signal to obtain n downlink optical signals, and sends the n downlink optical signals to n radio frequency units respectively. Specifically, a downlink optical signal 1 is sent to the radio frequency unit 1, a downlink optical signal 2 is sent to the radio frequency unit 2, and by analogy, a downlink optical signal n is sent to a radio frequency unit n. After the radio frequency unit 1 receives the downlink optical signal 1, the photoelectric detector in the optical module having the wavelength of 2 of the radio frequency unit 1 converts the downlink optical signal 1 into a downlink electrical signal 1, and the TIA in the optical module having the wavelength of 2 amplifies the downlink electrical signal 1, so as to obtain the downlink data 1 from an amplified downlink electrical signal 1. Similarly, other n−1 radio frequency units also perform similar processing to obtain corresponding downlink data.

In an uplink direction, a light source in an optical module having a wavelength of 2 of the radio frequency unit 1 generates an optical carrier having a wavelength of $\lambda_2$, and then modulates uplink data 1 that needs to be sent to the baseband unit to the optical carrier, to obtain an uplink optical signal 1. A light source in an optical module having a wavelength of 4 of the radio frequency unit 2 generates an optical carrier having a wavelength of $\lambda_4$, and then modulates uplink data 2 that needs to be sent to the baseband unit to the optical carrier, to obtain an uplink optical signal 2. By analogy, a light source in an optical module having a wavelength of 2n of the radio frequency unit n generates an optical carrier having a wavelength of $\lambda_{2n}$, and then modulates uplink data n that needs to be sent to the baseband unit to the optical carrier, to obtain an uplink optical signal n. Then, a multiplexer (Mux) on the site side multiplexes the n uplink optical signals to obtain an uplink combined optical signal, and sends the uplink combined optical signal to a baseband unit on an equipment room side through the optical fiber. A demultiplexer (DeMux) of the baseband unit demultiplexes the uplink combined optical signal to obtain n-channel uplink optical signals, and sends each of the n-channel uplink optical signals to n optical modules of the baseband unit. Specifically, the uplink optical signal 1 is sent to the optical module having the wavelength of 1, the uplink optical signal 2 is sent to the optical module having the wavelength of 3, and by analogy, an uplink optical signal n is sent to the optical module having the wavelength of 2n−1. After the optical module having the wavelength of 1 receives the uplink optical signal 1, a photoelectric detector in the optical module having the wavelength of 1 converts the uplink optical signal 1 into an uplink electrical signal 1, and a TIA in the optical module having the wavelength of 1 amplifies the uplink electrical signal 1, so as to obtain uplink data 1 from an amplified uplink electrical signal 1. Similarly, the other n−1 optical modules also perform similar processing to obtain corresponding uplink data.

In embodiments of this application, the multiplexer/demultiplexer may also be referred to as a fronthaul aggregation unit (FAU), a passive demultiplexer, or a wavelength division multiplexer/demultiplexer.

In embodiments of this application, the multiplexer and the demultiplexer in the baseband unit may be integrated, and are referred to as a multiplexer/demultiplexer, or may be two independent entities. Similarly, the multiplexer and the demultiplexer in the radio frequency unit may be integrated, or may be two independent entities.

In embodiments of this application, an optical fiber between the baseband unit and the radio frequency unit is also referred to as a fronthaul optical fiber.

In embodiments of this application, the photoelectric detector is also referred to as a photodiode (PD).

The foregoing fronthaul wavelength division multiplexing system may implement data transmission between one baseband unit and a plurality of radio frequency units on one optical fiber. However, the foregoing data transmission solution further has the following problems:

Problem 1: Different optical modules on the equipment room and the site side use different wavelengths and have different models. All types of optical modules need to be prepared for subsequent operation and maintenance. Engineers need to take all types of optical modules for maintenance. A quantity of optical modules is large, which increases operation and maintenance costs.

Problem 2: Different optical modules on the equipment room and the site side need to use different wavelengths. When an optical module needs to be added, ensure that a wavelength of the new optical module does not conflict with that of any optical module in use. Otherwise, a service interruption is caused and the operation and maintenance is difficult.

Problem 3: Each optical module includes a light source that provides a fixed wavelength. When a coarse wavelength division multiplexing (CWDM) standard is used, only a maximum of six-wavelength multiplexing can be supported, and a requirement of 5th generation (5G) communication for wireless fronthaul cannot be satisfied. In addition, a wavelength spacing of the CWDM is 20 nanometers (nm). Because the wavelength spacing is relatively large, the dispersion of the last two wavelengths (that is, 1350 nm and 1370 nm) is large. Therefore, an avalanche diode (APD) with higher sensitivity needs to be used to compensate for the power penalty caused by the dispersion, which leads to an increase in costs.

Problem 4: Each optical module includes a light source that provides a fixed wavelength. When a local area network wavelength division multiplexing (LWDM) standard is used, a maximum of twelve-wavelength multiplexing can be supported, which still cannot satisfy a requirement of future communication for wireless fronthaul. In addition, a wavelength spacing of the LWDM is 4.5 nm. Because the wavelength spacing is relatively small, interference occurs between adjacent wavelengths when temperature drift occurs. Therefore, each optical module needs to be configured with a thermoelectric cooler (TEC) to control a temperature of the optical module, so as to eliminate the interference between the adjacent wavelengths. However, increasing the thermoelectric cooler also leads to an increase in power consumption and costs.

Figure 3A:
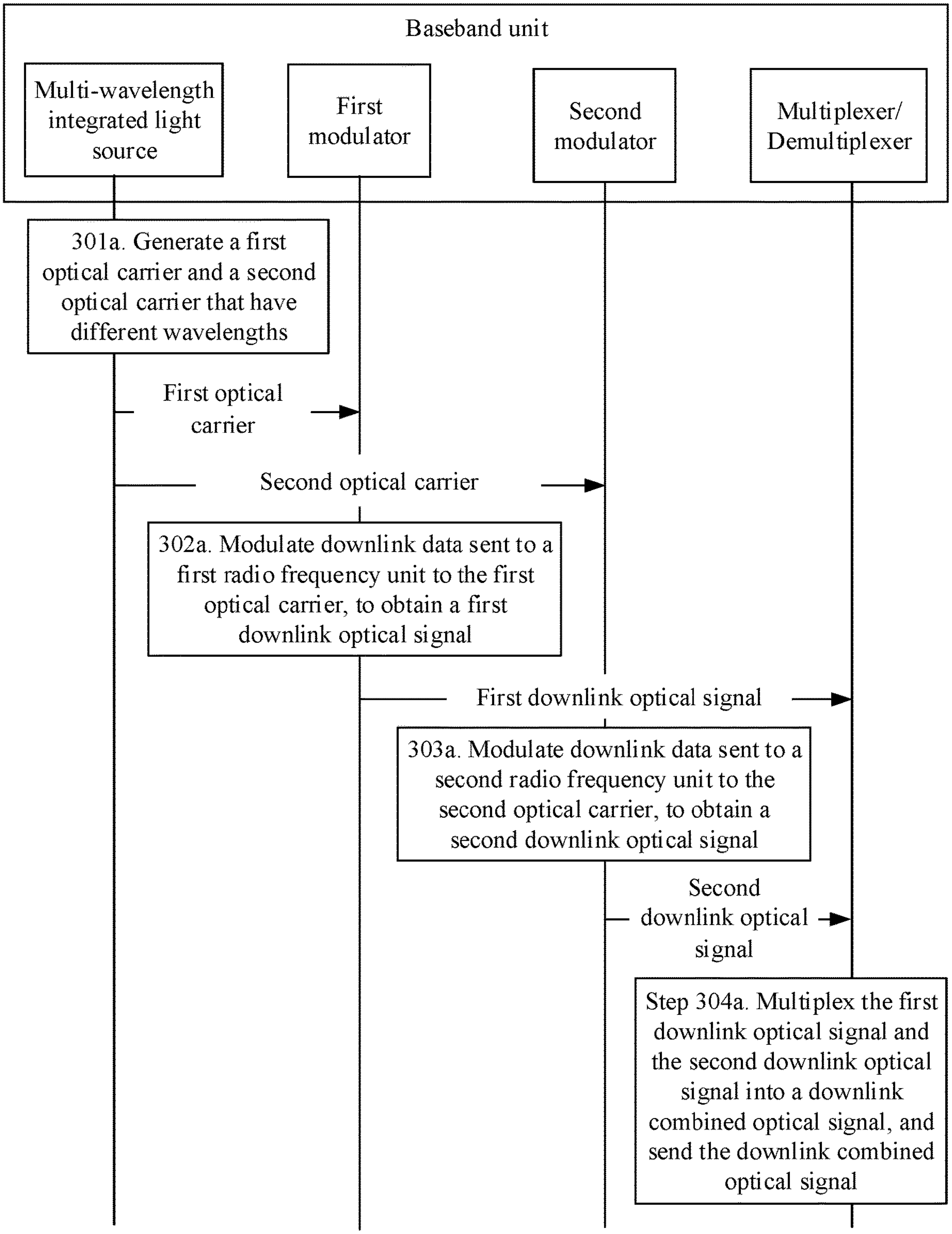
FIG. 3(*a*) is a schematic flowchart of a data transmission method according to an embodiment of this application.
Figures 1, 3B:
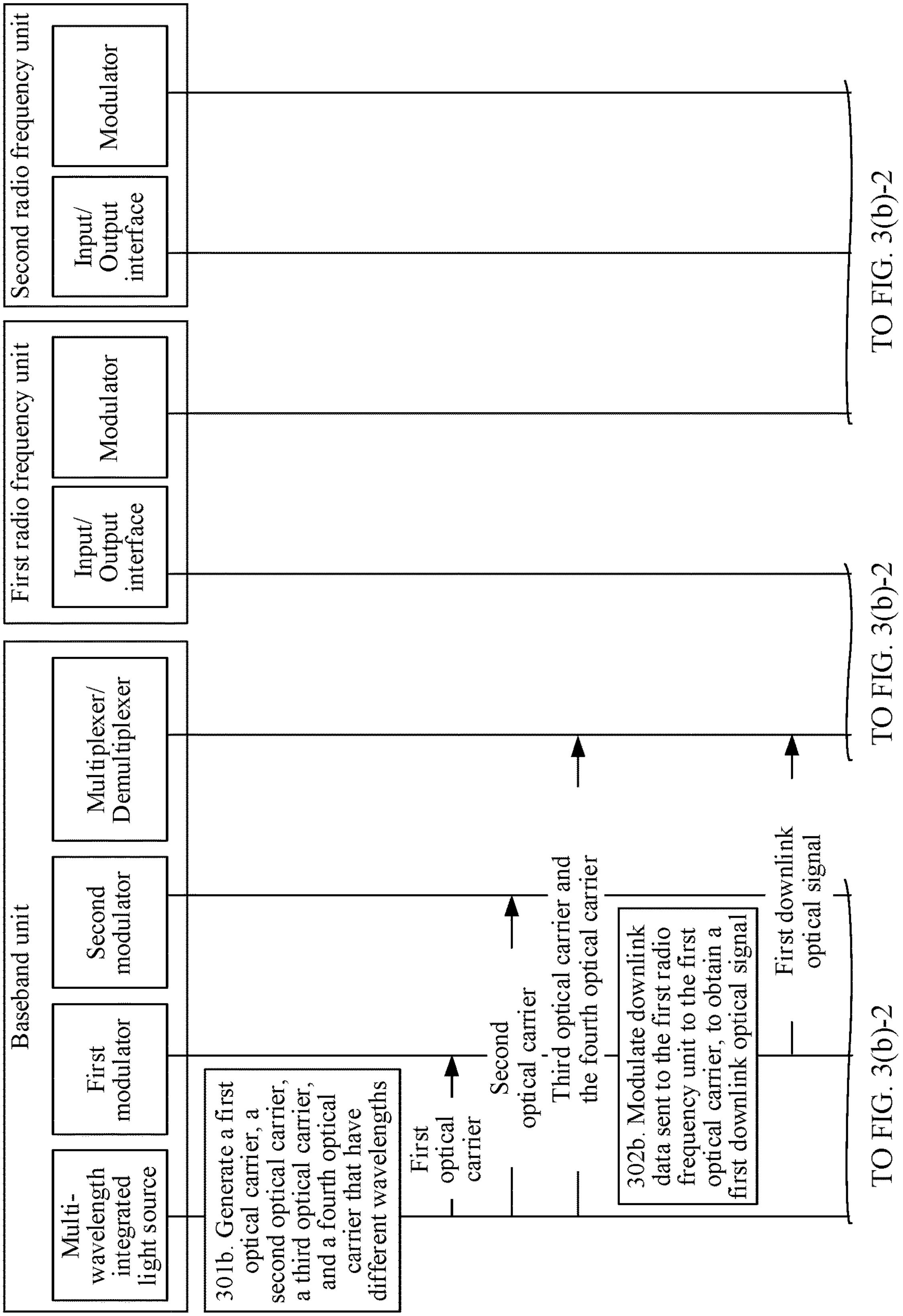
Figures 2, 3B:
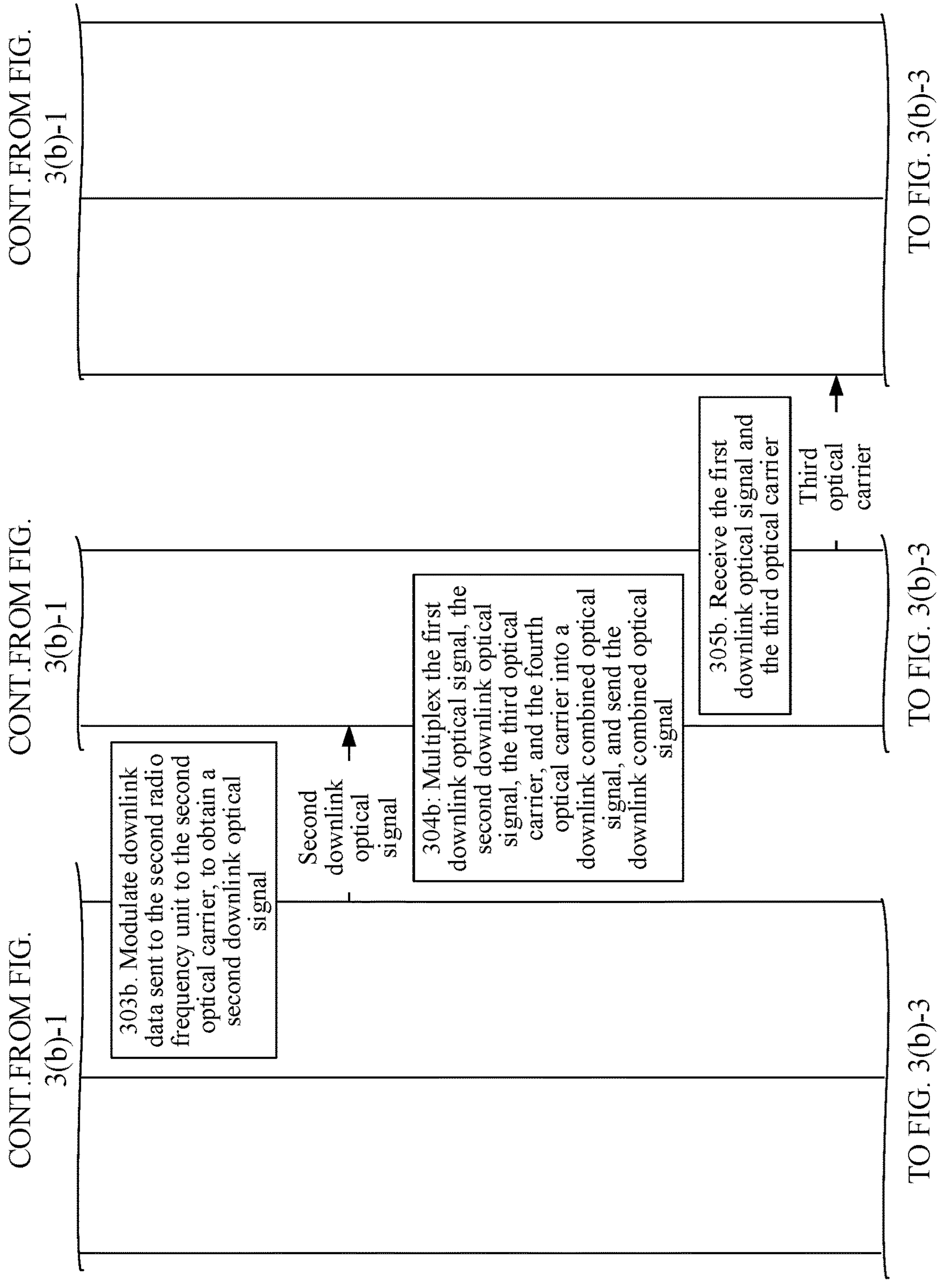
Figures 3, 3B:
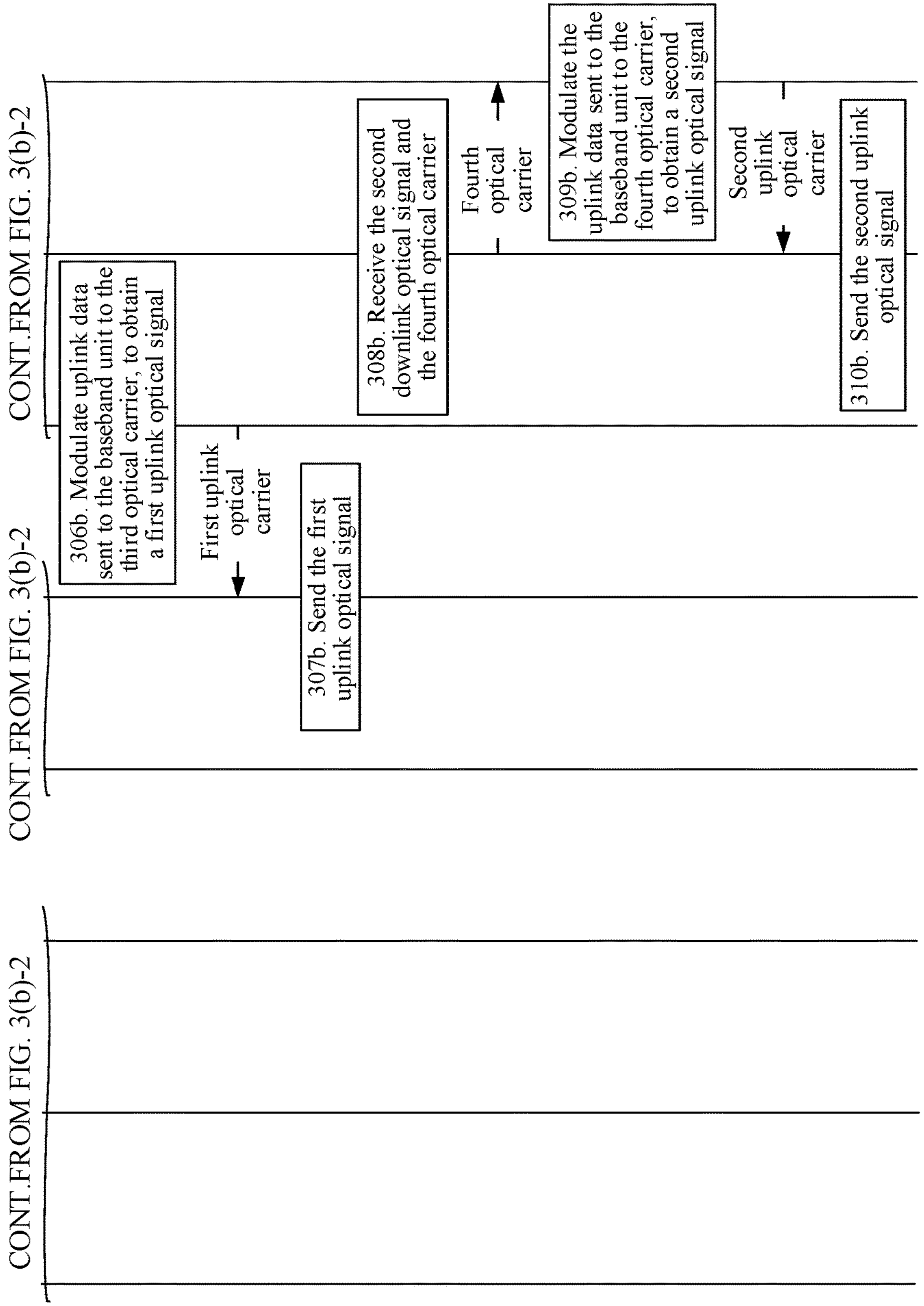
Figures 1, 3C:
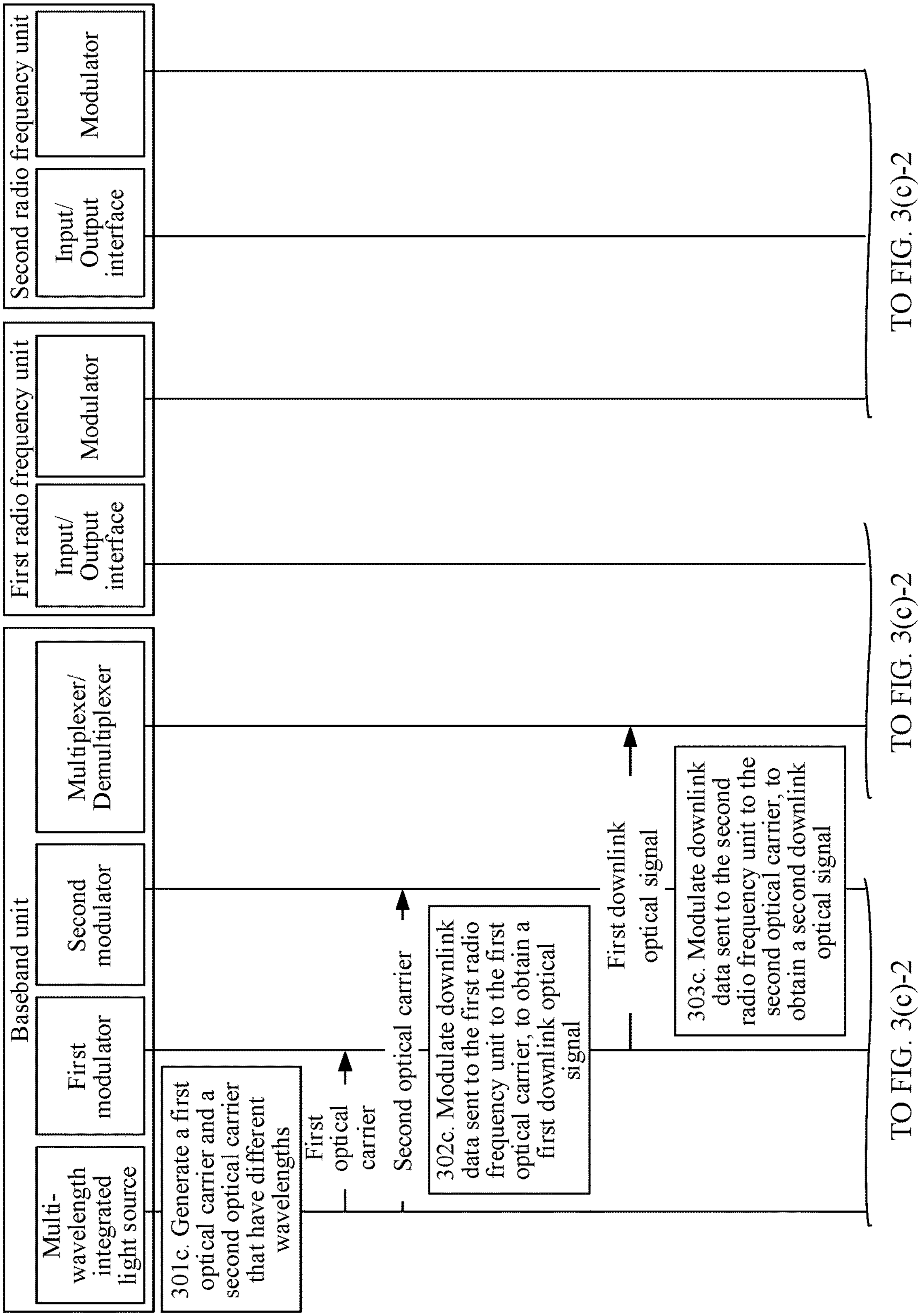
Figures 2, 3C:
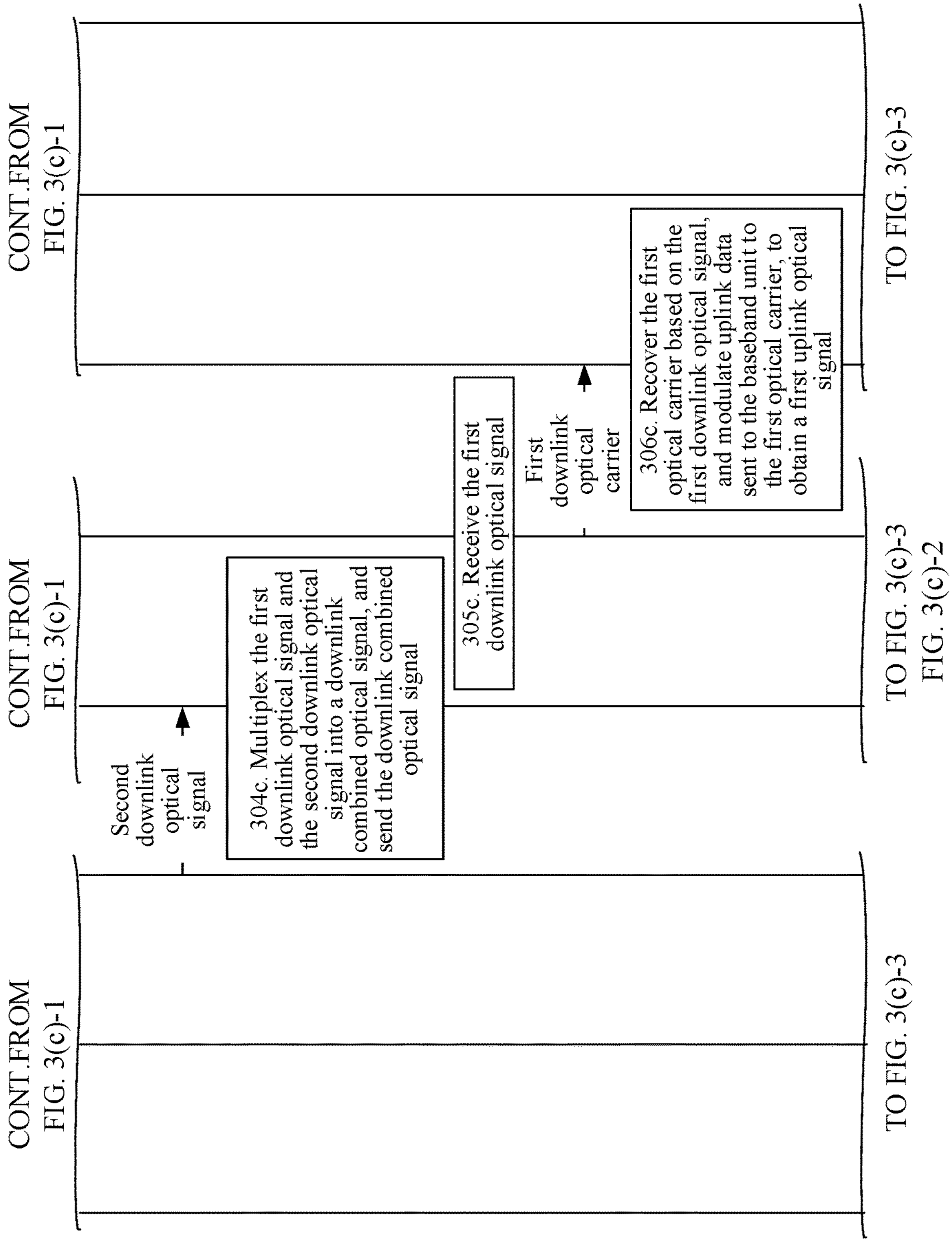
Figures 3, 3C:
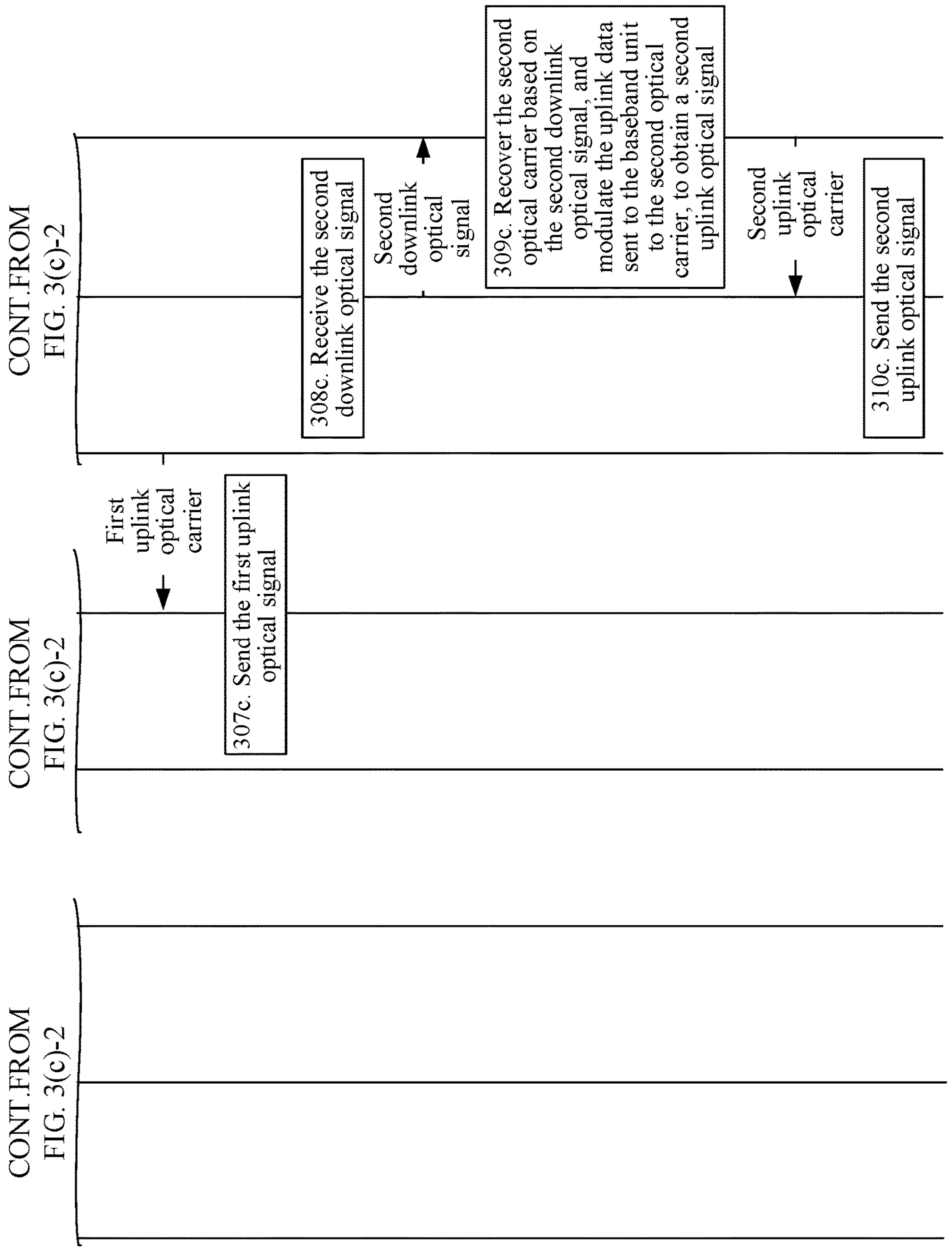

FIG. 3(*a*) is a schematic flowchart of a data transmission method according to an embodiment of this application. The method is applicable to downlink data transmission between a baseband unit and two or more radio frequency units. For ease of description, downlink data transmission between the baseband unit and two radio frequency units is taken as an example for description in the following.

The baseband unit includes a multi-wavelength integrated light source, a first modulator, a second modulator, and a multiplexer/demultiplexer. The multiplexer/demultiplexer is an integrated component of the multiplexer and the demultiplexer, or different components disposed independently, to implement multiplexing and demultiplexing functions.

The method includes the following steps:

Step 301*a*: A multi-wavelength integrated light source of a baseband unit generates a first optical carrier and a second optical carrier that have different wavelengths.

The multi-wavelength integrated light source is disposed in the baseband unit. The multi-wavelength integrated light source may generate a plurality of optical carriers having different wavelengths, for example, may generate the first optical carrier and the second optical carrier that have different wavelengths.

The first optical carrier and the second optical carrier generated by the multi-wavelength integrated light source are respectively sent to a first modulator of the baseband unit and a second modulator of the baseband unit. In an implementation, the first optical carrier and the second optical carrier generated by the multi-wavelength integrated light source are combined into one-channel optical carrier, the one-channel optical carrier is sent to a multiplexer/demultiplexer of the baseband unit. Then, the multiplexer/demultiplexer divides the one-channel optical carrier into the first optical carrier and the second optical carrier, sends the first optical carrier to the first modulator, and sends the second optical carrier to the second modulator.

Step 302*a*: A first modulator of the baseband unit modulates downlink data sent to a first radio frequency unit to the first optical carrier, to obtain a first downlink optical signal.

In an implementation, a first driver of the baseband unit may drive the first modulator to modulate the downlink data sent to the first radio frequency unit to the first optical carrier, so as to obtain the first downlink optical signal.

After obtaining the first downlink optical signal through modulation, the first modulator sends the first downlink optical signal to the multiplexer/demultiplexer of the baseband unit.

The first optical carrier and the first downlink optical signal have a same center frequency, but generally occupy different bandwidths.

Step 303*a*: A second modulator of the baseband unit modulates downlink data sent to a second radio frequency unit to the second optical carrier, to obtain a second downlink optical signal.

In an implementation, a second driver of the baseband unit may drive the second modulator to modulate the downlink data sent to the second radio frequency unit to the second optical carrier, so as to obtain the second downlink optical signal. The second driver and the first driver may be different drivers, or may be a same driver.

After obtaining the second downlink optical signal through modulation, the second modulator sends the second downlink optical signal to the multiplexer/demultiplexer of the baseband unit.

The second optical carrier and the second downlink optical signal have a same center frequency, but generally occupy different bandwidths.

It should be noted that there is no execution sequence between step 302*a* and step 303*a*.

Step 304*a*: A multiplexer/demultiplexer of the baseband unit multiplexes the first downlink optical signal and the second downlink optical signal into a downlink combined optical signal, and sends the downlink combined optical signal.

Specifically, the multiplexer/demultiplexer of the baseband unit sends the downlink combined optical signal to a site side through an optical fiber. The downlink combined optical signal is demultiplexed by the multiplexer/demultiplexer on the site side into the first downlink optical signal and the second downlink optical signal, and the multiplexer/demultiplexer on the site side sends the first downlink optical signal to an input/output interface of an optical module of the first radio frequency unit, and sends the second downlink optical signal to an input/output interface of an optical module of the second radio frequency unit.

After the input/output interface of the optical module of the first radio frequency unit receives the first downlink optical signal, a photoelectric detector of the optical module of the first radio frequency unit converts the first downlink optical signal into a downlink electrical signal, and a TIA of the optical module of the first radio frequency unit amplifies the downlink electrical signal, so as to obtain downlink data from an amplified downlink electrical signal. After the input/output interface of the optical module of the second radio frequency unit receives the second downlink optical signal, processing similar to that of the optical module of the first radio frequency unit is also performed subsequently, and details are not described herein again.

According to the foregoing solution, each optical module in the baseband unit is deconstructed, and the multi-wavelength integrated light source is disposed in the baseband unit. The multi-wavelength integrated light source can provide optical carriers that have a plurality of different wavelengths, and reduce a quantity of independent light sources in the baseband unit. This helps multi-channel modulator in the baseband unit be integrated on a monolithic, saves an area occupied by separate encapsulation of each optical module, greatly reduces a size, and increases a quantity of optical fiber interfaces that can be supported by the baseband unit. Therefore, device costs, fronthaul operation and maintenance costs, and complexity of the baseband unit are reduced.

FIG. 3(*b*)-1, FIG. 3(*b*)-2, and FIG. 3(*b*)-3 are a schematic flowchart of a data transmission method according to an embodiment of this application. The method is applicable to downlink data and uplink data transmission between a baseband unit and two or more radio frequency units. For ease of description, downlink data and uplink data transmission between the baseband unit and two radio frequency units is taken as an example for description in the following.

The baseband unit includes a multi-wavelength integrated light source, a first modulator, a second modulator, and a multiplexer/demultiplexer. The first radio frequency unit includes an input/input interface and a modulator. The second radio frequency unit includes an input/input interface and a modulator.

The method includes the following steps:

Step 301*b*: A multi-wavelength integrated light source of a baseband unit generates a first optical carrier, a second optical carrier, a third optical carrier, and a fourth optical carrier that have different wavelengths.

The multi-wavelength integrated light source is disposed in the baseband unit, and the multi-wavelength integrated light source may generate a plurality of optical carriers having different wavelengths, for example, may generate the first optical carrier, the second optical carrier, the third optical carrier, and the fourth optical carrier that have different wavelengths.

The multi-wavelength integrated light source sends a generated first optical carrier to the first modulator of the baseband unit, sends a generated second optical carrier to the second modulator of the baseband unit, and sends the third optical carrier and the fourth optical carrier to the multiplexer/demultiplexer of the baseband unit. In an implementation, the first optical carrier, the second optical carrier, the third optical carrier, and the fourth optical carrier generated by the multi-wavelength integrated light source are combined into one-channel optical carrier, and the one-channel optical carrier is sent to the multiplexer/demultiplexer of the baseband unit. Then, the multiplexer/demultiplexer divides the one-channel optical carrier into the first optical carrier, the second optical carrier, the third optical carrier, and the fourth optical carrier, sends the first optical carrier to the first modulator, and sends the second optical carrier to the second modulator.

Optionally, wavelength spacings between the first optical carrier, the second optical carrier, the third optical carrier, and the fourth optical carrier are fixed.

Step 302*b* is the same as step 302*a*.

Step 303*b* is the same as step 303*a*.

Step 304*b*: A multiplexer/demultiplexer of the baseband unit multiplexes a first downlink optical signal, a second downlink optical signal, the third optical carrier, and the fourth optical carrier into a downlink combined optical signal, and sends the downlink combined optical signal.

Specifically, the multiplexer/demultiplexer of the baseband unit sends the downlink combined optical signal to a site side through an optical fiber. The downlink combined optical signal is demultiplexed by the multiplexer/demultiplexer on the site side into the first downlink optical signal, the second downlink optical signal, the third optical carrier, and the fourth optical carrier, and the multiplexer/demultiplexer on the site side sends the first downlink optical signal and the third optical carrier to an input/output interface of an optical module of the first radio frequency unit, and send the second downlink optical signal and the fourth optical carrier to an input/output interface of an optical module of the second radio frequency unit.

Step 305*b*: An input/output interface of a first radio frequency unit receives the first downlink optical signal and the third optical carrier.

After the input/output interface of the optical module of the first radio frequency unit receives the first downlink optical signal, a photoelectric detector of the optical module of the first radio frequency unit converts the first downlink optical signal into a downlink electrical signal, and a TIA of the optical module of the first radio frequency unit amplifies the downlink electrical signal, so as to obtain downlink data from an amplified downlink electrical signal. In this way, the first radio frequency unit receives the downlink data sent by the baseband unit to the first radio frequency unit.

Step 306*b*: A modulator of the first radio frequency unit modulates uplink data sent to the baseband unit to the third optical carrier, to obtain a first uplink optical signal.

In an implementation, the modulator in the first radio frequency unit may be a device that integrates a reflective semiconductor optical amplifier (RSOA) and an electro-absorption modulator (EAM), and the modulator may be referred to as an RSOA-EAM for short.

The third optical carrier and the first uplink optical signal have a same center frequency, but generally occupy different bandwidths.

Step 307*b*: The input/output interface of the first radio frequency unit sends the first uplink optical signal.

Step 308*b*: An input/output interface of a second radio frequency unit receives the second downlink optical signal and the fourth optical carrier.

After the input/output interface of the optical module of the second radio frequency unit receives the second downlink optical signal, a photoelectric detector of the optical module of the second radio frequency unit converts the second downlink optical signal into a downlink electrical signal, and a TIA of the optical module of the second radio frequency unit amplifies the downlink electrical signal, so as to obtain downlink data from an amplified downlink electrical signal. In this way, the second radio frequency unit receives the downlink data sent by the baseband unit to the second radio frequency unit.

Step 309*b*: A modulator of the second radio frequency unit modulates the uplink data sent to the baseband unit to the fourth optical carrier, to obtain a second uplink optical signal.

In an implementation, the modulator in the second radio frequency unit may be an RSOA-EAM.

The fourth optical carrier and the second uplink optical signal have a same center frequency, but generally occupy different bandwidths.

Step 310*b*: The input/output interface of the second radio frequency unit sends the second uplink optical signal.

It should be noted that there is no sequence between step 305*b*, step 306*b*, and step 307*b* and step 308*b*, step 309*b*, and step 310*b*.

In an implementation, step 307*b* may include: the input/output interface of the first radio frequency unit sends the first uplink optical signal to the multiplexer/demultiplexer on the site side; and step 310*b* may include: the input/output interface of the second radio frequency unit sends the second uplink optical signal to the multiplexer/demultiplexer on the site side, and then the multiplexer/demultiplexer on the site side combines the first uplink optical signal and the second uplink optical signal into an uplink combined optical signal, and sends the uplink combined optical signal to the baseband unit through the optical fiber. The downlink combined optical signal and the uplink combined optical signal may be transmitted in a same optical fiber, or may be transmitted in two different optical fibers.

After the baseband unit receives the uplink combined optical signal, the multiplexer/demultiplexer of the baseband unit demultiplexes the uplink combined optical signal into the first uplink optical signal and the second uplink optical signal, and then a first photoelectric detector of the baseband unit converts the first uplink optical signal into an electrical signal, a first TIA of the baseband unit amplifies the electrical signal, and obtains the uplink data sent by the first radio frequency unit to the baseband unit from an amplified electrical signal. A second photoelectric detector of the baseband unit converts the second uplink optical signal into an electrical signal, a second TIA of the baseband unit amplifies the electrical signal, and obtains the uplink data sent by the second radio frequency unit to the baseband unit from an amplified electrical signal.

According to the foregoing solution, each optical module in the baseband unit is deconstructed, and the multi-wavelength integrated light source is disposed in the baseband unit. The multi-wavelength integrated light source can provide optical carriers that have a plurality of different wavelengths, and reduce a quantity of independent light sources in the baseband unit. This helps multi-channel modulator in the baseband unit be integrated on a monolithic, saves an area occupied by separate encapsulation of each optical module, greatly reduces a size, and increases a quantity of optical fiber interfaces that can be supported by the baseband unit. Therefore, device costs, fronthaul operation and maintenance costs, and complexity of the baseband unit are reduced. In addition, because the baseband unit on the equipment room side provides an optical carrier for the optical module of the radio frequency unit on the site side, it is beneficial to reduce a quantity of optical modules in the radio frequency unit or even not need an independent light source, and the following advantages are provided: (1) Costs in the optical module of the radio frequency unit may be reduced, and power consumption required by the optical module to stabilize a light source wavelength may be reduced. (2) Unified scheduling and management may be implemented to avoid service interruption caused by a conflict between a wavelength of an optical module used by a newly powered-on radio frequency unit and a wavelength of a working optical module, thereby implementing intelligent operation and maintenance. (3) Optical modules in different radio frequency units on the site side have a same model, and wavelengths do not need to be distinguished, which facilitates maintenance and installation.

FIG. 3(*c*)-1, FIG. 3(*c*)-2, and FIG. 3(*c*)-3 are a schematic flowchart of a data transmission method according to an embodiment of this application. The method is applicable to downlink data and uplink data transmission between a baseband unit and two or more radio frequency units. For ease of description, downlink data and uplink data transmission between the baseband unit and two radio frequency units is taken as an example for description in the following.

The baseband unit includes a multi-wavelength integrated light source, a first modulator, a second modulator, and a multiplexer/demultiplexer. The first radio frequency unit includes an input/input interface and a modulator. The second radio frequency unit includes an input/input interface and a modulator.

The method includes the following steps:

Step 301*c* is the same as step 301*a*.

Step 302*c* is the same as step 302*a*.

Step 303*c* is the same as step 303*a*.

Step 304*c* is the same as step 304*a*.

Step 305*c*: An input/output interface of a first radio frequency unit receives the first downlink optical signal.

After the input/output interface of the optical module of the first radio frequency unit receives the first downlink optical signal, a power splitter of the optical module of the first radio frequency unit splits the first downlink optical signal into two same downlink optical signals a, where one downlink optical signal a is sent to the photoelectric detector of the optical module of the first radio frequency unit, and the other downlink optical signal a is sent to a modulator of the optical module of the first radio frequency unit.

The photoelectric detector of the optical module of the first radio frequency unit converts a received downlink optical signal a into a downlink electrical signal, and the TIA of the optical module of the first radio frequency unit amplifies the downlink electrical signal, so as to obtain downlink data from an amplified downlink electrical signal. In this way, the first radio frequency unit receives the downlink data sent by the baseband unit to the first radio frequency unit.

Step 306*c*: A modulator of the first radio frequency unit recovers the first optical carrier based on the first downlink optical signal, and modulates uplink data sent to the baseband unit to the first optical carrier, to obtain a first uplink optical signal.

Specifically, the modulator of the first radio frequency unit recovers the first optical carrier based on the downlink optical signal a, where the downlink optical signal a is obtained by performing power splitting on the first downlink optical signal by the power splitter.

In an implementation, the modulator in the first radio frequency unit may be an RSOA-EAM.

The first optical carrier and the first uplink optical signal have a same center frequency, but generally occupy different bandwidths.

Step 307*c*: The input/output interface of the first radio frequency unit sends the first uplink optical signal.

Step 308*c*: The input/output interface of the second radio frequency unit receives the second downlink optical signal.

After the input/output interface of the optical module of the second radio frequency unit receives the second downlink optical signal, a power splitter of the optical module of the second radio frequency unit splits the second downlink optical signal into two same downlink optical signals b, where one downlink optical signal b is sent to the photoelectric detector of the optical module of the second radio frequency unit, and the other downlink optical signal b is sent to a modulator of the optical module of the second radio frequency unit.

The photoelectric detector of the optical module of the second radio frequency unit converts a received downlink optical signal b into a downlink electrical signal, and the TIA of the optical module of the second radio frequency unit amplifies the downlink electrical signal, so as to obtain downlink data from an amplified downlink electrical signal. In this way, the second radio frequency unit receives the downlink data sent by the baseband unit to the second radio frequency unit.

Step 309*c*: A modulator of the second radio frequency unit recovers the second optical carrier based on the second downlink optical signal, and modulates the uplink data sent to the baseband unit to the second optical carrier, to obtain a second uplink optical signal.

Specifically, the modulator of the second radio frequency unit recovers the second optical carrier based on the downlink optical signal b, where the downlink optical signal b is obtained by performing power splitting on the second downlink optical signal by the power splitter.

In an implementation, the modulator in the second radio frequency unit may be an RSOA-EAM.

The second optical carrier and the second uplink optical signal have a same center frequency, but generally occupy different bandwidths.

Step 310*c*: The input/output interface of the second radio frequency unit sends the second uplink optical signal.

It should be noted that there is no sequence between step 305*c*, step 306*c*, and step 307*c* and step 308*c*, step 309*c*, and step 310*c*.

In an implementation, step 307*c* may include: the input/output interface of the first radio frequency unit sends the first uplink optical signal to the multiplexer/demultiplexer on the site side; and step 310*c* may include: the input/output interface of the second radio frequency unit sends the second uplink optical signal to the multiplexer/demultiplexer on the site side, and then the multiplexer/demultiplexer on the site side combines the first uplink optical signal and the second uplink optical signal into an uplink combined optical signal, and sends the uplink combined optical signal to the baseband unit through the optical fiber. The downlink combined optical signal and the uplink combined optical signal may be transmitted in a same optical fiber, or may be transmitted in two different optical fibers.

For a processing manner after the baseband unit receives the uplink combined optical signal, reference may be made to the description in the embodiment in FIG. 3(*b*)-1, FIG. 3(*b*)-2, and FIG. 3(*b*)-3.

The embodiment in FIG. 3(*c*)-1, FIG. 3(*c*)-2, and FIG. 3(*c*)-3 has beneficial effects of the embodiment in FIG. 3(*b*)-1, FIG. 3(*b*)-2, and FIG. 3(*b*)-3, and further has the following beneficial effects: the downlink data sent by the baseband unit to a radio frequency unit and the uplink data sent by the radio frequency unit to the baseband unit are carried in an optical carrier having a same wavelength for transmission, which is beneficial to saving optical carrier resources.

It should be noted that, in the foregoing embodiments in FIG. 3(*a*), FIG. 3(*b*)-1, FIG. 3(*b*)-2, FIG. 3(*b*)-3, FIG. 3(*c*)-1, FIG. 3(*c*)-2, and FIG. 3(*c*)-3, an example in which the baseband unit includes the multi-wavelength integrated light source, the first modulator, the second modulator, and the multiplexer/demultiplexer, and the radio frequency unit includes the input/output interface and the modulator is used for description. In an actual application, the baseband unit or the radio frequency unit may include only some devices in the foregoing devices, alternatively, the foregoing devices are not included, but other devices that have functions of the foregoing devices are included. Specific internal devices of the baseband unit and the radio frequency unit are not limited in embodiments of this application.

In an implementation, it is not necessary to pay attention to internal device composition of the baseband unit. Therefore, the foregoing step 301*a*, step 302*a*, step 303*a*, step 304*a*, step 301*b*, step 302*b*, step 303*b*, step 304*b*, step 301*c*, step 302*c*, step 303*c*, and step 304*c* may be uniformly considered as operations of the baseband unit.

In an implementation, it is not necessary to pay attention to the internal device composition of the radio frequency unit. Therefore, step 305*b*, step 306*b*, step 307*b*, step 305*c*, step 306*c*, and step 307*c* may be uniformly considered as operations of the first radio frequency unit, and step 308*b*, step 309*b*, step 310*b*, step 308*c*, step 309*c*, and step 310*c* may be uniformly considered as operations of the second radio frequency unit.

The following describes the foregoing solutions with reference to some embodiments. The following embodiments in FIG. 4A, FIG. 4B, FIG. 5A, and FIG. 5B are some examples of the embodiments in FIG. 3(*a*), FIG. 3(*b*)-1, FIG. 3(*b*)-2, and FIG. 3(*b*)-3. The following embodiments in FIG. 6A, FIG. 6B, FIG. 7A, and FIG. 7B are some examples of the embodiments in FIG. 3(*a*), FIG. 3(*c*)-1, FIG. 3(*c*)-2, and FIG. 3(*c*)-3.

Figure 4A:
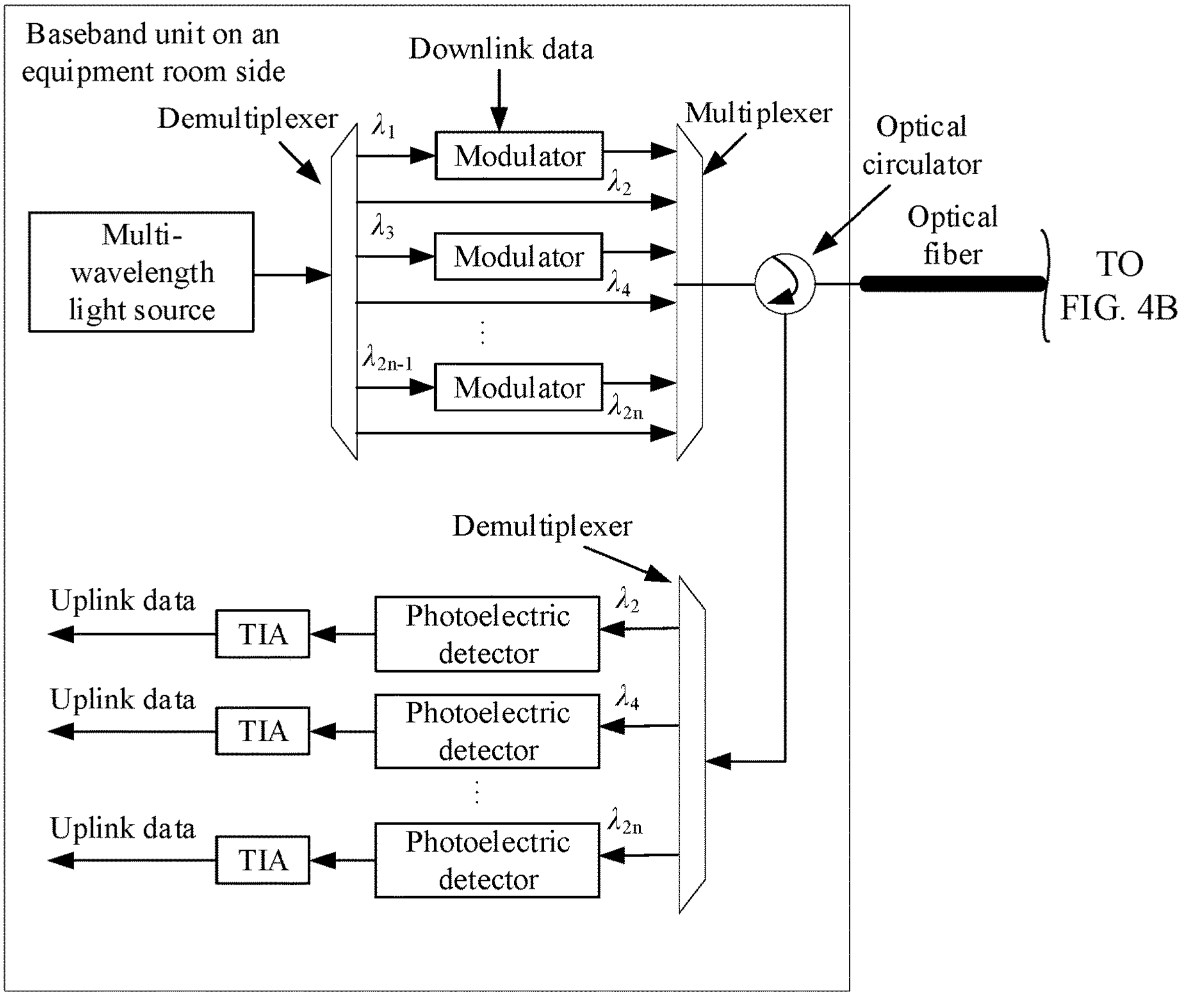
FIG. 4A, and FIG. 4B are a schematic diagram of another fronthaul wavelength division multiplexing system according to an embodiment of this application.
Figure 4B:
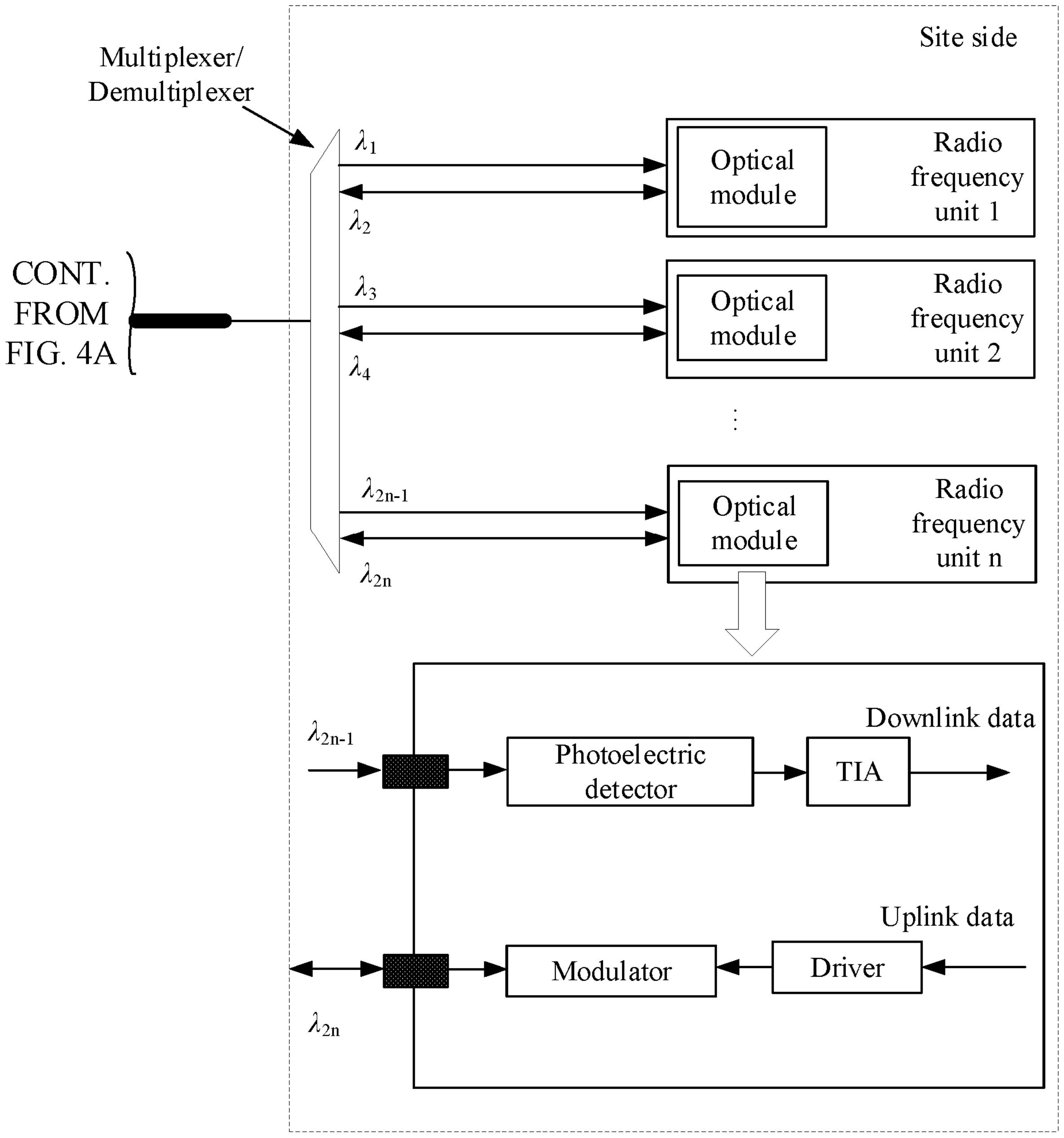

FIG. 4A, and FIG. 4B are a schematic diagram of another fronthaul wavelength division multiplexing system according to an embodiment of this application. The system has the following features:

Feature 1: Each optical module in the baseband unit is deconstructed, a light source is disposed outside the baseband unit, and a multi-wavelength integrated light source is disposed in the baseband unit. The multi-wavelength integrated light source can provide 2n (n is an integer greater than 1) types of optical carriers that have different wavelengths and fixed wavelength spacings. A multi-channel modulator, a drive circuit, a photoelectric detector, and a TIA in the baseband unit may be integrated on a monolithic chip, to save an area occupied by separate encapsulation of each optical module, greatly reduce a size, and increase a quantity of optical fiber interfaces that can be supported by the baseband unit. Therefore, device costs, fronthaul operation and maintenance costs, and complexity of the baseband unit are reduced.

In an actual application, the multi-wavelength integrated light source may provide optical carriers that have dozens or even hundreds of different wavelengths. This is because a plurality of wavelengths in the system are generated by a same light source. Therefore, if wavelength drift occurs, the plurality of wavelengths drift at the same time based on a same amplitude, and the plurality of wavelengths do not interfere with each other.

In an implementation, the multi-wavelength integrated light source in the baseband unit may be implemented by using an integrated mode-locked laser or a soliton optical frequency comb.

Feature 2: The optical module of the radio frequency unit on the site side does not include the light source. The multi-wavelength integrated light source of the baseband unit generates an optical carrier and sends the optical carrier to the radio frequency unit. Then, the radio frequency unit uses the optical carrier to carry uplink data. That is, the optical carrier for carrying the uplink data is generated by the baseband unit for the radio frequency unit, instead of the optical carrier generated by the radio frequency unit.

The optical module of the radio frequency unit on the site side does not require the light source. Instead, the baseband unit on the equipment room side provides the optical carrier for the radio frequency unit. In this way, costs in the optical module of the radio frequency unit may be reduced, and power consumption required when the optical module stabilizes a wavelength of the light source may be reduced.

Because the optical module of the radio frequency unit on the site side does not require the light source. Instead, the baseband unit on the equipment room side provides the optical carrier for the radio frequency unit. In this way, unified scheduling and management may be implemented, and service interruption caused by a conflict between a wavelength of an optical module used by a newly powered-on radio frequency unit and a wavelength of a working optical module may be avoided, thereby implementing intelligent operation and maintenance.

The optical module in the radio frequency unit on the site side does not require the light source. Instead, the baseband unit in the equipment room side provides the optical carrier for the radio frequency unit. Therefore, optical modules in different radio frequency units on the site side have a same model, and wavelengths do not need to be distinguished, which facilitates maintenance and installation.

Feature 3: Different wavelengths are used for uplink and downlink transmission from the equipment room to the site and from the site to the equipment room. In addition, uplink data and downlink data are transmitted in a same optical fiber, which shares fronthaul optical fiber resources.

Specifically, the multi-wavelength integrated light source of the baseband unit may generate 2n (n is an integer greater than 1) types of optical carriers that have different wavelengths and fixed wavelength spacings. The 2n optical carriers are multiplexed into one-channel optical carrier and sent to the demultiplexer. Then, the demultiplexer demultiplexes the one-channel optical carrier into 2n optical carriers that have different wavelengths. The optical carriers that have wavelengths of $\lambda_1, \lambda_3, \ldots, \lambda_{2n-1}$ are respectively for carrying downlink data that needs to be sent to the radio frequency unit 1, the radio frequency unit 2, . . . , and the radio frequency unit n. The optical carriers that have wavelengths of $\lambda_2, \lambda_4, \ldots, \lambda_{2n}$ are respectively sent to the radio frequency unit 1, the radio frequency unit 2, . . . , and the radio frequency unit n, and are used by each radio frequency unit to carry uplink data that needs to be sent to the baseband unit. In addition, the uplink data and the downlink data are transmitted in a same optical fiber, which helps save optical fiber resources.

Based on the system, the data transmission method is as follows:

In the downlink direction, a driver 1 of the baseband unit drives a modulator 1 of the baseband unit to modulate downlink data 1 that needs to be sent to the radio frequency unit 1 to an optical carrier having a wavelength of λ1 to obtain a downlink optical signal 1. A driver 2 of the baseband unit drives a modulator 2 of the baseband unit to modulate downlink data 2 that needs to be sent to the radio frequency unit 2 to an optical carrier having a wavelength of $\lambda_3$ to obtain a downlink optical signal 2. By analogy, a driver n of the baseband unit drives a modulator n of the baseband unit to modulate a downlink data n that needs to be sent to the radio frequency unit n to an optical carrier having a wavelength of $\lambda_{2n-1}$ to obtain a downlink optical signal n. Then, the multiplexer in the baseband unit multiplexes the n downlink optical signals and n optical carriers that have wavelengths of $\lambda_2, \lambda_4, \ldots, \lambda_{2n}$ to obtain a downlink combined optical signal, and sends the downlink combined optical signal to the site side through the optical fiber. The demultiplexer on the site side demultiplexes the downlink combined optical signal to obtain n downlink optical signals and n optical carriers that have wavelengths of $\lambda_2, \lambda_4, \ldots, \lambda_{2n}$, and then sends a downlink optical signal 1 and an optical carrier having a wavelength of $\lambda_2$ to the optical module of the radio frequency unit 1, sends a downlink optical signal 2 and an optical carrier having a wavelength of $\lambda_4$ to the optical module of the radio frequency unit 2. By analogy, a downlink optical signal n and an optical carrier having a wavelength $\lambda_{2n}$ are sent to an optical module of the radio frequency unit n. The optical module of the radio frequency unit 1 receives the downlink optical signal 1, a photoelectric detector in the optical module of the radio frequency unit 1 converts the downlink optical signal 1 into a downlink electrical signal 1, and then a TIA in the optical module of the radio frequency unit 1 amplifies the downlink electrical signal 1 and obtains downlink data 1 from an amplified downlink electrical signal 1. The optical module of the radio frequency unit 2 receives a downlink optical signal 2, a photoelectric detector in the optical module of the radio frequency unit 2 converts the downlink optical signal 2 into a downlink electrical signal 2, and then a TIA in the optical module of the radio frequency unit 2 amplifies the downlink electrical signal 2 and obtains downlink data 2 from an amplified downlink electrical signal 2. By analogy, the optical module of the radio frequency unit n receives a downlink optical signal n, a photoelectric detector in the optical module of the radio frequency unit n converts the downlink optical signal n into a downlink electrical signal n, and then a TIA in the optical module of the radio frequency unit n amplifies the downlink electrical signal n and obtains downlink data n from an amplified downlink electrical signal n.

In the uplink direction, a modulator in the optical module of the radio frequency unit 1 amplifies a received optical carrier having a wavelength of $\lambda_2$, and then a driver in the optical module of the radio frequency unit 1 drives the modulator in the optical module of the radio frequency unit 1 to modulate uplink data 1 that needs to be sent to the baseband unit to the optical carrier having the wavelength of $\lambda_2$ to obtain an uplink optical signal 1. A modulator in the optical module of the radio frequency unit 2 amplifies a received optical carrier having a wavelength of $\lambda_4$, and then a driver in the optical module of the radio frequency unit 2 drives the modulator in the optical module of the radio frequency unit 2 to modulate uplink data 2 that needs to be sent to the baseband unit to the optical carrier having the wavelength of $\lambda_4$ to obtain an uplink optical signal 2. By analogy, a modulator in the optical module of the radio frequency unit n amplifies a received optical carrier having a wavelength of $\lambda_{2n}$, and then a driver in the optical module of the radio frequency unit n drives the modulator in the optical module of the radio frequency unit n to modulate uplink data n that needs to be sent to the baseband unit to the optical carrier having the wavelength of $\lambda_{2n}$ to obtain an uplink optical signal n. The multiplexer on the site side multiplexes the n uplink optical signals to obtain an uplink combined optical signal, and sends the uplink combined optical signal to the baseband unit through the optical fiber. An optical circulator of the baseband unit may separate the uplink combined optical signal from the downlink combined optical signal, to obtain an uplink combined optical signal from the site side, and then the demultiplexer of the baseband unit demultiplexes the uplink combined optical signal to obtain n uplink optical signals. A photoelectric detector 1 of the baseband unit converts the uplink optical signal 1 into an uplink electrical signal 1, and then a TIA 1 of the baseband unit amplifies the uplink electrical signal 1 to obtain the uplink data 1. A photoelectric detector 2 of the baseband unit converts the uplink optical signal 2 into an uplink electrical signal 2, and then a TIA 2 of the baseband unit amplifies the uplink electrical signal 2 to obtain the uplink data 2. By analogy, a photoelectric detector n of the baseband unit converts the uplink optical signal n into an uplink electrical signal n, and then a TIA n of the baseband unit amplifies the uplink electrical signal n to obtain the uplink data n.

In an implementation, the modulator in the baseband unit may be an electro-optic modulator.

In an implementation, the modulator in the radio frequency unit may be an RSOA-EAM.

Figure 5A:
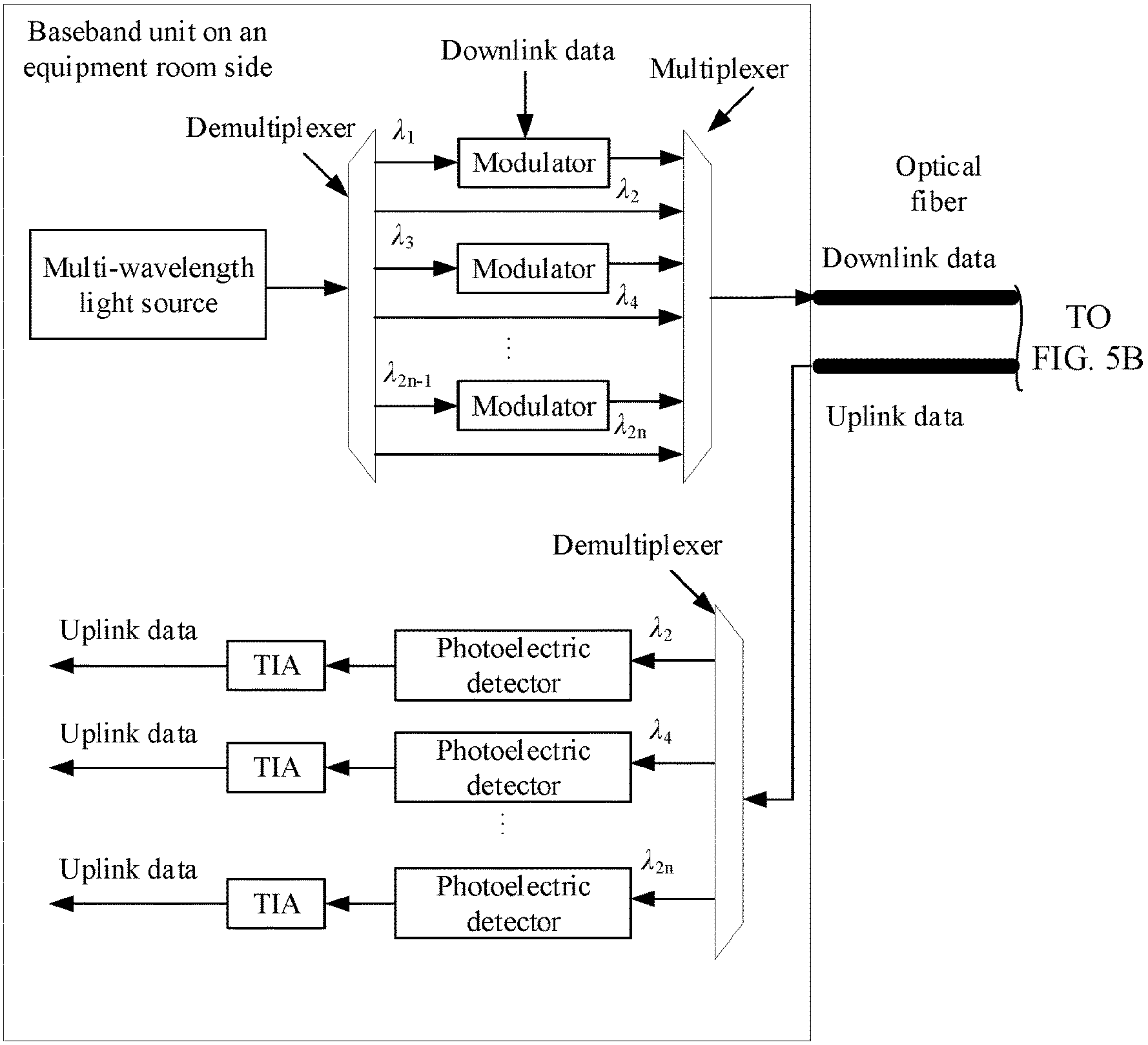
FIG. 5A, and FIG. 5B are a schematic diagram of still another fronthaul wavelength division multiplexing system according to an embodiment of this application.
Figure 5B:
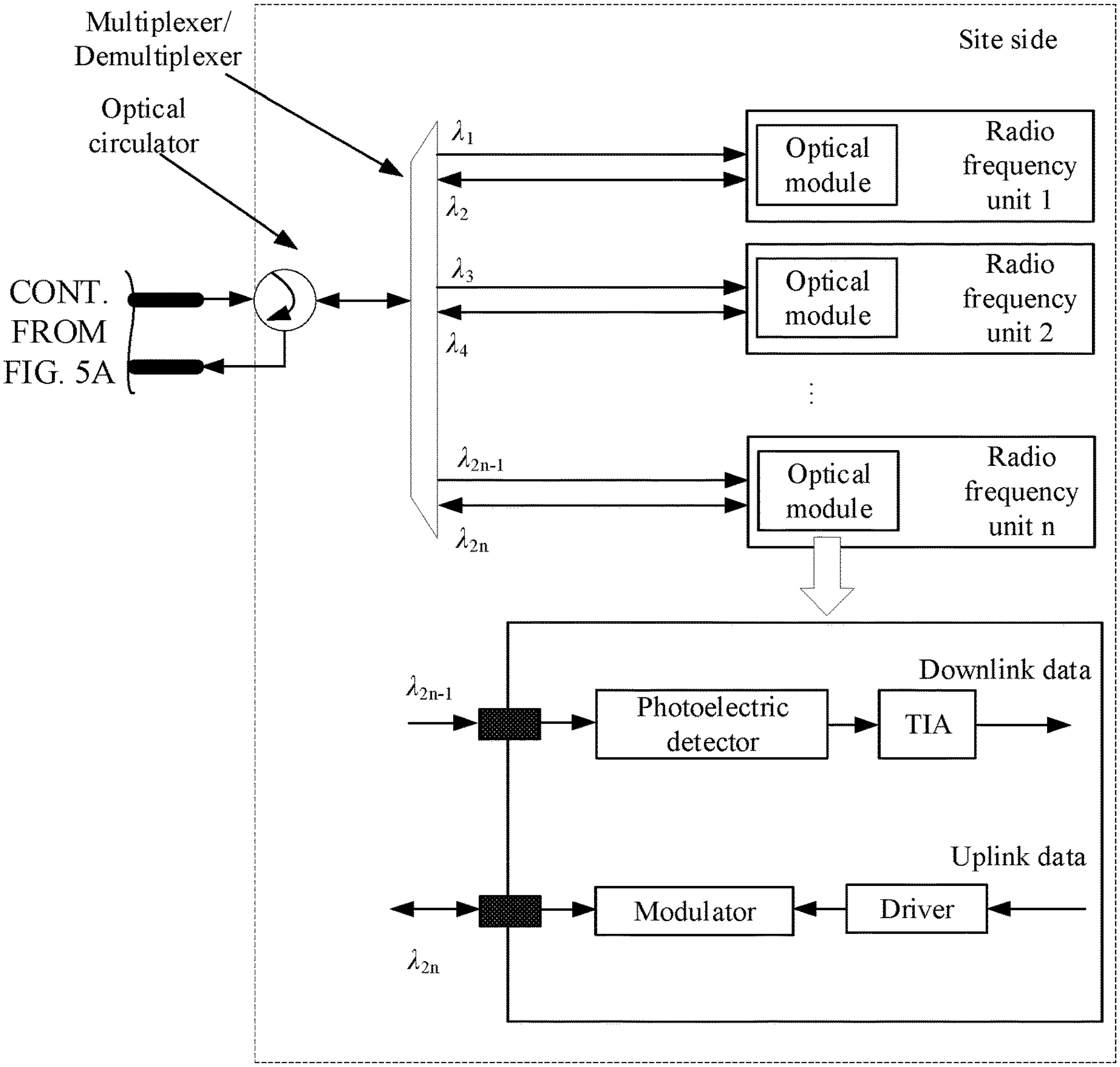

FIG. 5A, and FIG. 5B are a schematic diagram of still another fronthaul wavelength division multiplexing system according to an embodiment of this application. The system has the following features:

Feature 1: The same as the feature 1 of the system in FIG. 4A, and FIG. 4B.

Feature 2: The same as the feature 2 of the system in FIG. 4A, and FIG. 4B.

Feature 3: Different wavelengths are used for uplink and downlink transmission from the equipment room to the site and from the site to the equipment room. In addition, uplink data and downlink data are transmitted in different optical fibers.

Specifically, the multi-wavelength integrated light source of the baseband unit may generate 2n (n is an integer greater than 1) types of optical carriers that have different wavelengths and fixed wavelength spacings. The 2n optical carriers are multiplexed into one-channel optical carrier and sent to the demultiplexer. Then, the demultiplexer demultiplexes the one-channel optical carrier into 2n optical carriers that have different wavelengths. The optical carriers that have wavelengths of $\lambda_1, \lambda_3, \ldots, \lambda_{2n-1}$ are respectively for carrying downlink data that needs to be sent to the radio frequency unit 1, the radio frequency unit 2, . . . , and the radio frequency unit n. The optical carriers that have wavelengths of $\lambda_2$, $\lambda_2$, . . . , $\lambda_{2n}$ are respectively sent to the radio frequency unit 1, the radio frequency unit 2, . . . , and the radio frequency unit n, and are used by each radio frequency unit to carry uplink data that needs to be sent to the baseband unit. In addition, the uplink data and the downlink data are transmitted in different optical fibers, which helps avoid mutual interference between the uplink signal and the downlink signal.

A main difference between the system in FIG. 5A, and FIG. 5B and the system in FIG. 4A, and FIG. 4B during data transmission is as follows: In the system in FIG. 5A, and FIG. 5B, in the uplink direction, the multiplexer on the site side multiplexes n uplink optical signals to obtain the uplink combined optical signal, and then the uplink combined optical signal passes through an optical circulator. The optical circulator may separate the uplink combined optical signal from the downlink combined optical signal, and then send the uplink combined optical signal to the baseband unit through an independent optical fiber.

Figure 6A:
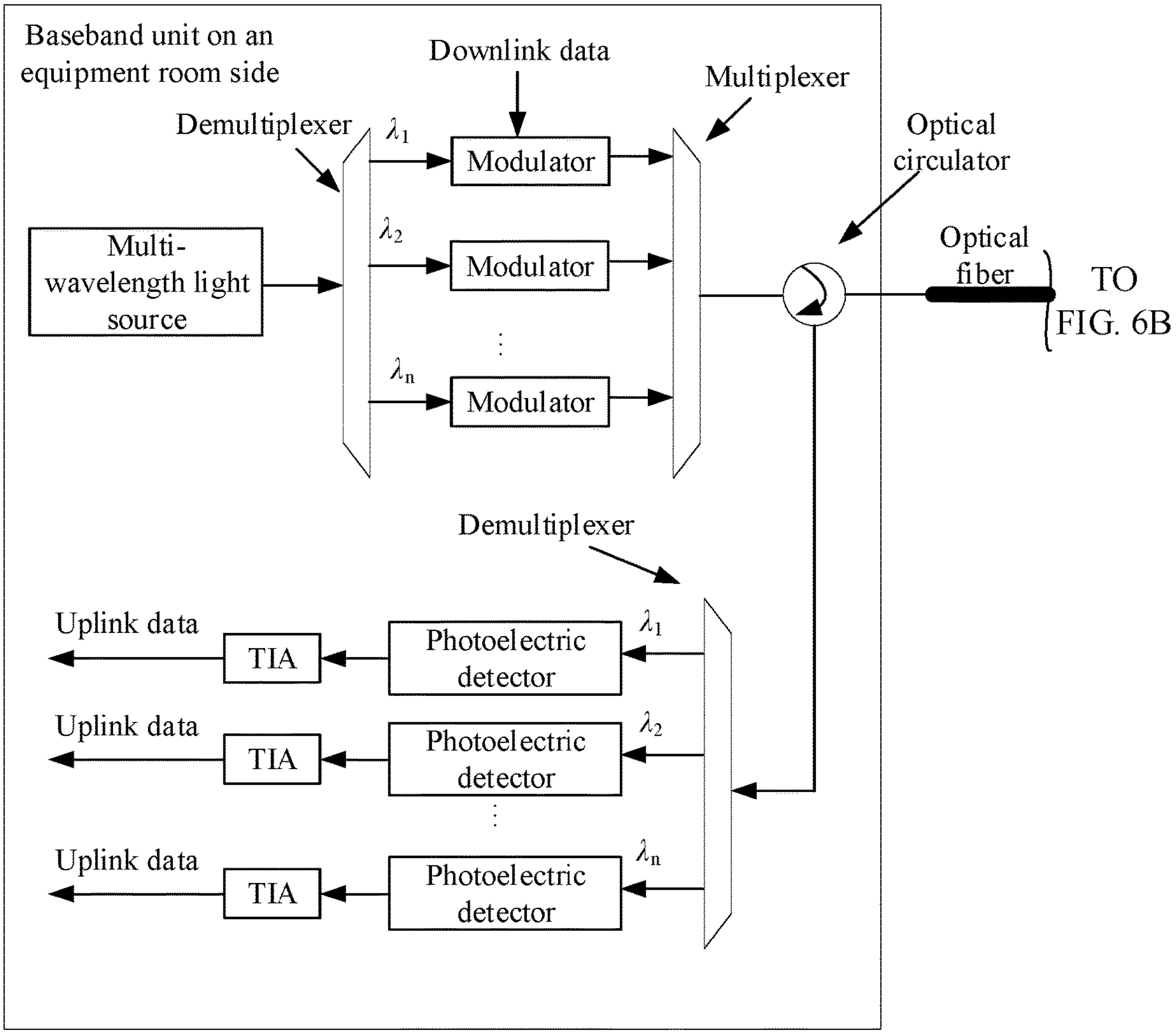
FIG. 6A, and FIG. 6B are a schematic diagram of still another fronthaul wavelength division multiplexing system according to an embodiment of this application.
Figure 6B:
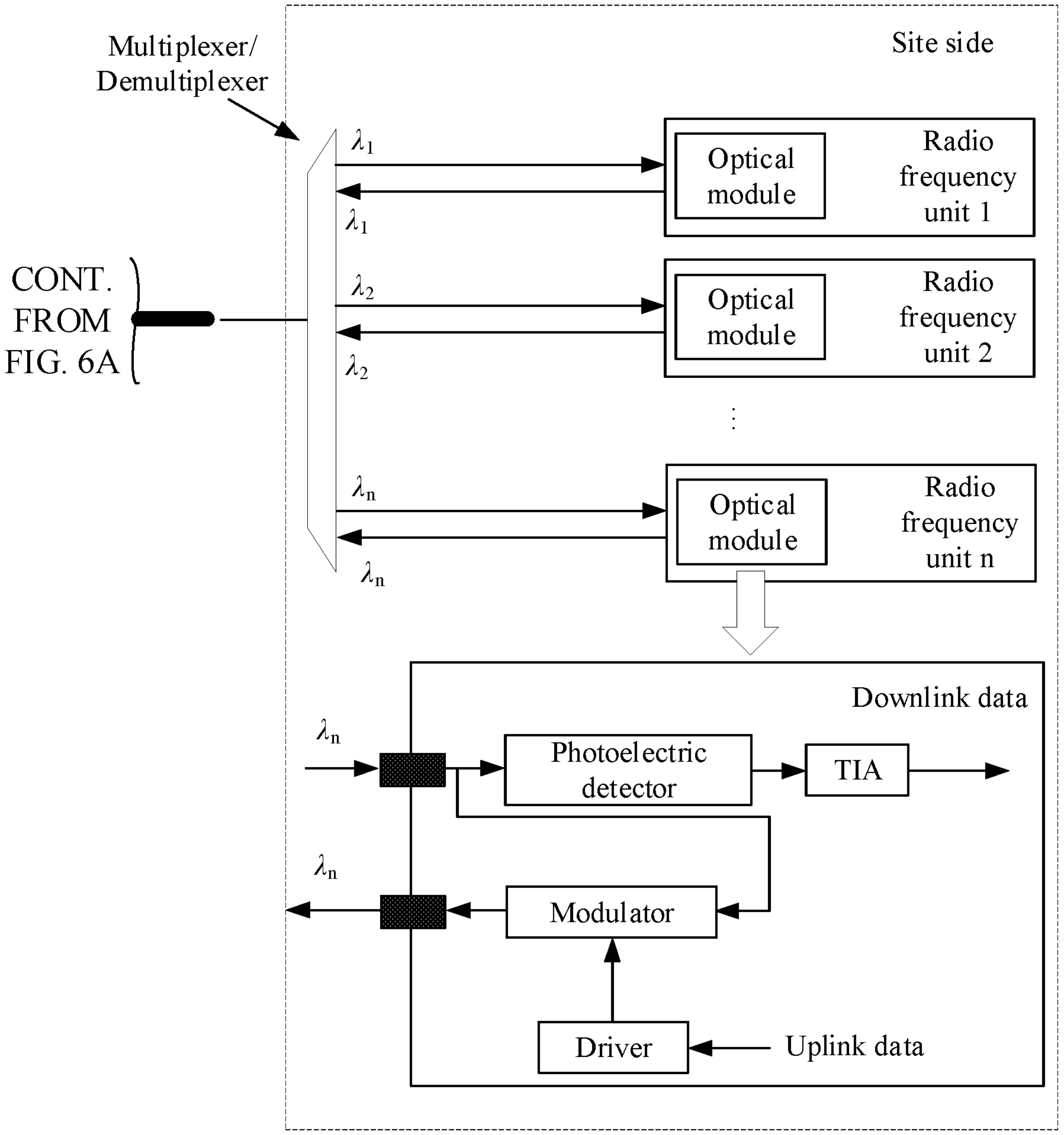

FIG. 6A, and FIG. 6B are a schematic diagram of a fronthaul wavelength division multiplexing system according to an embodiment of this application. The system has the following features:

Feature 1: Similar to the feature 1 of the system in FIG. 4A, and FIG. 4B.

Different from the feature 1 of the system in FIG. 4A, and FIG. 4B, in the system in FIG. 6A, and FIG. 6B, the multi-wavelength integrated light source of the baseband unit can provide n (n is an integer greater than 1) types of optical carriers that have different wavelengths and fixed wavelength spacings, instead of 2n types of optical carriers that have different wavelengths and fixed wavelength spacings. The downlink data sent by the baseband unit to a radio frequency unit and the uplink data sent by the radio frequency unit to the baseband unit are carried in an optical carrier having a same wavelength for transmission, which is beneficial to saving optical carrier resources.

Feature 2: The same as the feature 2 of the system in FIG. 4A, and FIG. 4B.

Feature 3: A same wavelength is used for uplink and downlink transmission from the equipment room to the site and from the site to the equipment room. In addition, uplink data and downlink data are transmitted in a same optical fiber.

Specifically, the multi-wavelength integrated light source of the baseband unit may generate n (n is an integer greater than 1) types of optical carriers that have different wavelengths and fixed wavelength spacings. The n optical carriers are multiplexed into one-channel optical carrier and sent to the demultiplexer. Then, the demultiplexer demultiplexes the one-channel optical carrier into n optical carriers that have different wavelengths. The optical carriers that have wavelengths of $\lambda_1$, $\lambda_2$, . . . , and $\lambda_n$ are respectively used to carry downlink data that needs to be sent to the radio frequency unit 1, radio frequency unit 2, . . . , and radio frequency unit n. The radio frequency unit 1, the radio frequency unit 2, . . . , and the radio frequency unit n on the site side also respectively use optical carriers that have wavelengths of $\lambda_1$, $\lambda_2$, . . . , and $\lambda_n$ to carry uplink data that needs to be sent to the baseband unit. In addition, the uplink data and the downlink data are transmitted in a same optical fiber, which helps save optical fiber resources.

Based on the system, the data transmission method is as follows:

In the downlink direction, a driver 1 of the baseband unit drives a modulator 1 of the baseband unit to modulate downlink data 1 that needs to be sent to the radio frequency unit 1 to an optical carrier having a wavelength of $\lambda_1$ to obtain a downlink optical signal 1. A driver 2 of the baseband unit drives a modulator 2 of the baseband unit to modulate downlink data 2 that needs to be sent to the radio frequency unit 2 to an optical carrier having a wavelength of $\lambda_2$ to obtain a downlink optical signal 2. By analogy, a driver n of the baseband unit drives a modulator n of the baseband unit to modulate a downlink data n that needs to be sent to the radio frequency unit n to an optical carrier having a wavelength of $\lambda_n$ to obtain a downlink optical signal n. Then, the multiplexer in the baseband unit multiplexes the n downlink optical signals to obtain a downlink combined optical signal, and sends the downlink combined optical signal to the site side through the optical fiber. The demultiplexer on the site side demultiplexes the downlink combined optical signal to obtain n downlink optical signals, and then sends the downlink optical signal 1 to the optical module of the radio frequency unit 1, sends the downlink optical signal 2 to the optical module of the radio frequency unit 2, and by analogy, sends the downlink optical signal n to the optical module of the radio frequency unit n. The optical module of the radio frequency unit 1 receives the downlink optical signal 1, and a power splitter of the radio frequency unit 1 splits the downlink optical signal 1 into two same downlink optical signals 1', where one downlink optical signal 1' is sent to the photoelectric detector in the optical module of the radio frequency unit 1, the other downlink optical signal 1' is sent to the modulator in the optical module of the radio frequency unit 1, the photoelectric detector in the optical module of the radio frequency unit 1 converts a received downlink optical signal 1' into a downlink electrical signal 1, and then the TIA in the optical module of the radio frequency unit 1 amplifies the downlink electrical signal 1 and obtains downlink data 1 from an amplified downlink electrical signal 1. The optical module of the radio frequency unit 2 receives the downlink optical signal 2, and a power splitter of the radio frequency unit 2 splits the downlink optical signal 2 into two same downlink optical signals 2', where one downlink optical signal 2' is sent to the photoelectric detector in the optical module of the radio frequency unit 2, the other downlink optical signal 2' is sent to the modulator in the optical module of the radio frequency unit 2, the photoelectric detector in the optical module of the radio frequency unit 2 converts a received downlink optical signal 2' into a downlink electrical signal 2, and then the TIA in the optical module of the radio frequency unit 2 amplifies the downlink electrical signal 2 and obtains downlink data 2 from an amplified downlink electrical signal 2. By analogy, the optical module of the radio frequency unit n receives the downlink optical signal n, and a power splitter of the radio frequency unit n splits the downlink optical signal n into two same downlink optical signals n', where one downlink optical signal n' is sent to the photoelectric detector in the optical module of the radio frequency unit n, the other downlink optical signal n' is sent to the modulator in the optical module of the radio frequency unit n, the photoelectric detector in the optical module of the radio frequency unit n converts a received downlink optical signal n' into a downlink electrical signal n, and then the TIA in the optical module of the radio frequency unit n amplifies the downlink electrical signal n and obtains the downlink data n from an amplified downlink electrical signal n.

In the uplink direction, the modulator in the optical module of the radio frequency unit 1 amplifies the downlink optical signal 1' received from the power splitter of the radio frequency unit 1, erases the downlink data 1 in the downlink optical signal 1', and recovers the optical carrier having the wavelength of $\lambda_1$. Then, the driver in the optical module of the radio frequency unit 1 drives the modulator in the optical module of the radio frequency unit 1 to modulate the uplink data 1 that needs to be sent to the baseband unit to the optical carrier having the wavelength of $\lambda_1$, to obtain an uplink optical signal 1. The modulator in the optical module of the radio frequency unit 2 amplifies the downlink optical signal 2' received from the power splitter of the radio frequency unit 2, erases the downlink data 2 in the downlink optical signal 2', and recovers the optical carrier having the wavelength of $\lambda_2$. Then, the driver in the optical module of the radio frequency unit 2 drives the modulator in the optical module of the radio frequency unit 2 to modulate the uplink data 2 that needs to be sent to the baseband unit to the optical carrier having the wavelength of $\lambda_2$, to obtain an uplink optical signal 2. By analogy, the modulator in the optical module of the radio frequency unit n amplifies the downlink optical signal n' received from the power splitter of the radio frequency unit n, erases the downlink data n in the downlink optical signal n', and recovers the optical carrier having the wavelength of $\lambda_n$. Then, the driver in the optical module of the radio frequency unit n drives the modulator in the optical module of the radio frequency unit n to modulate the uplink data n that needs to be sent to the baseband unit to the optical carrier having the wavelength of $\lambda_n$, to obtain an uplink optical signal n. The multiplexer on the site side multiplexes the n uplink optical signals to obtain an uplink combined optical signal, and sends the uplink combined optical signal to the baseband unit through the optical fiber. An optical circulator of the baseband unit may separate the uplink combined optical signal from the downlink combined optical signal, to obtain an uplink combined optical signal from the site side, and then the demultiplexer of the baseband unit demultiplexes the uplink combined optical signal to obtain n uplink optical signals. A photoelectric detector 1 of the baseband unit converts the uplink optical signal 1 into an uplink electrical signal 1, and then a TIA 1 of the baseband unit amplifies the uplink electrical signal 1 to obtain the uplink data 1. A photoelectric detector 2 of the baseband unit converts the uplink optical signal 2 into an uplink electrical signal 2, and then a TIA 2 of the baseband unit amplifies the uplink electrical signal 2 to obtain the uplink data 2. By analogy, a photoelectric detector n of the baseband unit converts the uplink optical signal n into an uplink electrical signal n, and then a TIA n of the baseband unit amplifies the uplink electrical signal n, to obtain the uplink data n.

In an implementation, the modulator in the baseband unit may be an electro-optic modulator.

In an implementation, the modulator in the radio frequency unit may be an RSOA-EAM.

Figure 7A:
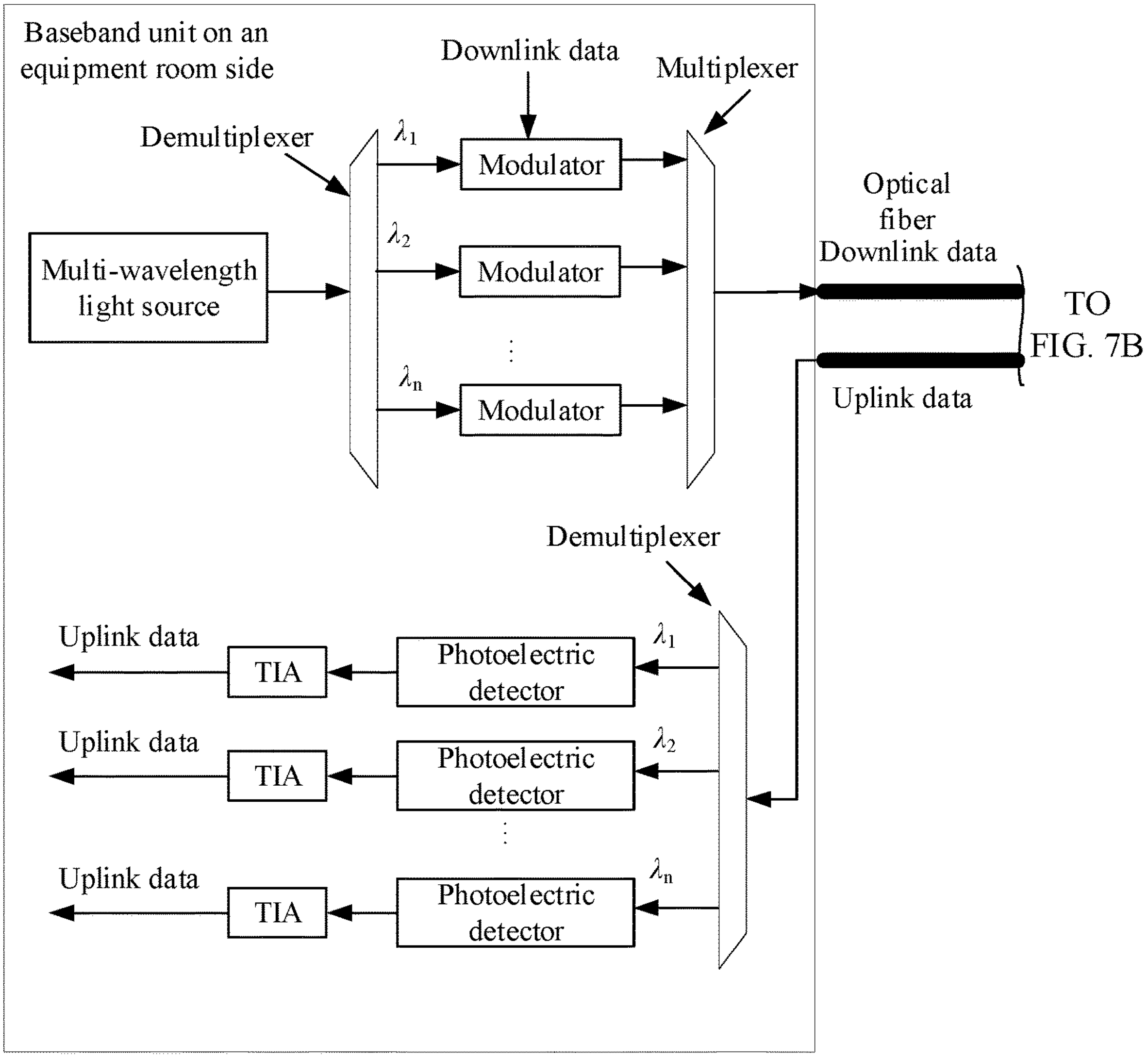
FIG. 7A, and FIG. 7B are a schematic diagram of still another fronthaul wavelength division multiplexing system according to an embodiment of this application.
Figure 7B:
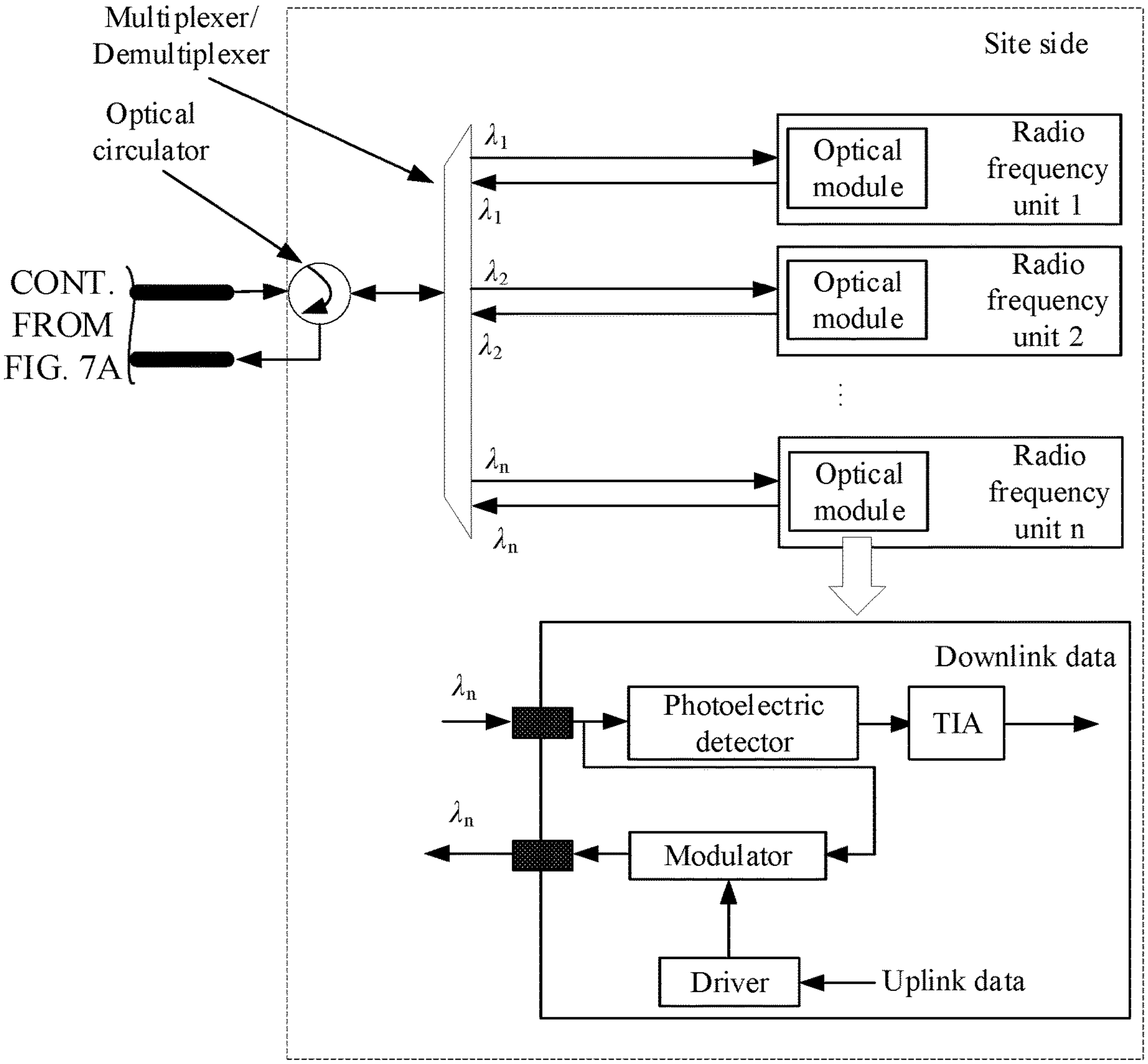

FIG. 7A, and FIG. 7B are a schematic diagram of still another fronthaul wavelength division multiplexing system according to an embodiment of this application. The system has the following features:

Feature 1: The same as the feature 1 of the system in FIG. 6A, and FIG. 6B.

Feature 2: The same as the feature 2 of the system in FIG. 6A, and FIG. 6B.

Feature 3: A same wavelength is used for uplink and downlink transmission from the equipment room to the site and from the site to the equipment room. In addition, uplink data and downlink data are transmitted in different optical fibers.

Specifically, the multi-wavelength integrated light source of the baseband unit may generate n (n is an integer greater than 1) types of optical carriers that have different wavelengths and fixed wavelength spacings. The n optical carriers are multiplexed into one-channel optical carrier and sent to the demultiplexer. Then, the demultiplexer demultiplexes the one-channel optical carrier into n optical carriers that have different wavelengths. The optical carriers that have wavelengths of $\lambda_1$, $\lambda_2$, . . . , and $\lambda_n$ are respectively used to carry downlink data that needs to be sent to the radio frequency unit 1, radio frequency unit 2, . . . , and radio frequency unit n. The radio frequency unit 1, the radio frequency unit 2, . . . , and the radio frequency unit n on the site side also respectively use optical carriers that have wavelengths of $\lambda_1$, λ2, . . . , and $\lambda_n$ to carry uplink data that needs to be sent to the baseband unit. In addition, the uplink data and the downlink data are transmitted in a same optical fiber, which helps avoid mutual interference between the uplink signal and the downlink signal.

A main difference between the system in FIG. 7A, and FIG. 7B and the system in FIG. 6A, and FIG. 6B during data transmission is as follows: In the system in FIG. 7A, and FIG. 7B, in the uplink direction, the multiplexer on the site side multiplexes n uplink optical signals to obtain the uplink combined optical signal, and then the uplink combined optical signal passes through an optical circulator. The optical circulator may separate the uplink combined optical signal from the downlink combined optical signal, and then send the uplink combined optical signal to the baseband unit through an independent optical fiber.

It may be understood that, to implement the functions in the foregoing embodiments, the baseband unit and the radio frequency unit include a corresponding hardware structure and/or software module for performing each function. A person skilled in the art should be easily aware that, in combination with the units and the method steps in the examples described in embodiments disclosed in this application, this application can be implemented through hardware or a combination of hardware and computer software. Whether a function is executed through hardware or hardware driven by computer software depends on particular application scenarios and design constraint conditions of the technical solutions.

Figure 8:
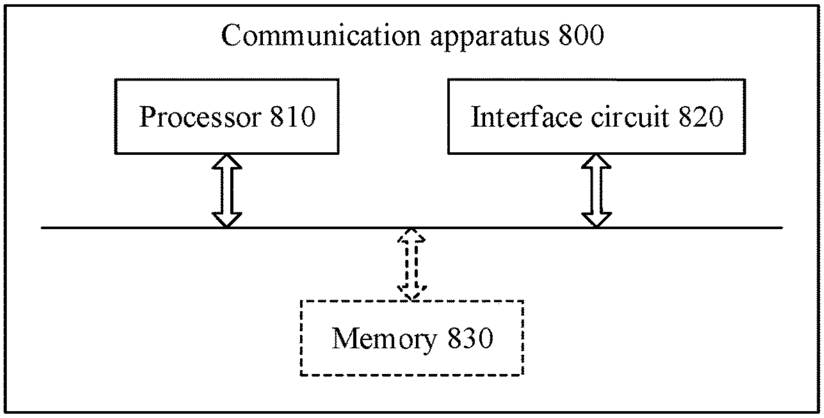
FIG. 8 is a schematic diagram of a communication apparatus according to an embodiment of this application.

FIG. 8 is a schematic diagram of a structure of a possible communication apparatus according to an embodiment of this application. The communication apparatus may be configured to implement functions of the baseband unit or the radio frequency unit in the foregoing method embodiments, and therefore can also achieve beneficial effects of the foregoing method embodiments. In embodiments of this application, the communication apparatus may be a baseband unit or a radio frequency unit, or may be a module (for example, a chip) used in a baseband unit or a radio frequency unit.

As shown in FIG. 8, a communication apparatus 800 includes a processor 810 and an interface circuit 820. The processor 810 and the interface circuit 820 are coupled to each other. It may be understood that the interface circuit 820 may be a transceiver or an input/output interface. Optionally, the communication apparatus 800 may further include a memory 830, configured to: store instructions to be executed by the processor 810, store input data required for running the instructions by the processor 810, or store data generated after the processor 810 runs the instructions.

When the communication apparatus 800 is configured to implement a function of the baseband unit in the foregoing method embodiments, the processor 810 is configured to implement functions of one or more devices in the modulator, the multiplexer/demultiplexer, the photoelectric detector, and the TIA in the baseband unit.

When the communication apparatus 800 is configured to implement a function of the radio frequency unit in the foregoing method embodiments, the processor 810 is configured to implement functions of one or more devices in the modulator, the multiplexer/demultiplexer, the photoelectric detector, and the TIA in the radio frequency unit.

It may be understood that, the processor in embodiments of this application may be a central processing unit (CPU), or may be another general-purpose processor, a digital signal processor (DSP), an application specific integrated circuit (ASIC), a field programmable gate array (FPGA) or another programmable logic device, a transistor logic device, a hardware component, or any combination thereof. The general-purpose processor may be a microprocessor, or may be any conventional processor, or the like.

The method steps in embodiments of this application may be implemented in a hardware manner, or may be implemented by executing software instructions by a processor. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a base station or a terminal. Certainly, the processor and the storage medium may exist in a base station or terminal as discrete components.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer programs and instructions. When the computer programs or instructions are loaded and executed on a computer, all or some of the procedures or functions in embodiments of this application are executed. The computer may be a general-purpose computer, a dedicated computer, a computer network, a base station, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired manner or in a wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape; or may be an optical medium, for example, a digital video disc; or may be a semiconductor medium, for example, a solid state disk. The computer-readable storage medium may be a volatile or a non-volatile storage medium, or may include two types of storage media: a volatile storage medium and a non-volatile storage medium.

In embodiments of this application, unless otherwise specified and there is a logical conflict, terms and/or descriptions in different embodiments are consistent and may be mutually referenced. Technical features in different embodiments may be combined based on an internal logical relationship thereof, to form a new embodiment.

In this application, "at least one" refers to one or more, and "a plurality of" refers to two or more. "And/or" describes an association relationship between associated objects, and indicates that three relationships may exist. For example, A and/or B may indicate the following cases: Only A exists, both A and B exist, and only B exists, where A and B may be singular or plural. In the text descriptions of this application, the character "/" generally indicates an "or" relationship between the associated objects. In a formula in this application, the character "I" indicates a "division" relationship between the associated objects.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes.

The invention claimed is:

1. A radio frequency unit, comprising an input/output interface, a power splitter and a modulator, wherein the input/output interface is configured to receive an optical carrier modulated with downlink data from a baseband unit;

the power splitter is configured to split the optical carrier into a first part of the optical carrier to a photoelectric detector for downlink data reception and a second part of the optical carrier to the modulator for uplink data modulation;

the modulator is configured to modulate uplink data sent to the baseband unit to the second part of the optical carrier, to obtain an uplink optical signal; and the input/output interface is further configured to send the uplink optical signal to the baseband unit.

2. The radio frequency unit of claim 1, wherein the optical carrier and the uplink optical signal are transmitted in a same optical fiber; or the optical carrier and the uplink optical signal are transmitted in two different optical fibers.

3. The radio frequency unit of claim 1, wherein the modulator is configured to amplify the second part of the optical carrier and erase the downlink data in the second part of the optical signal before modulating the uplink data.

4. A system comprising a baseband unit and a plurality of radio frequency units, wherein the baseband unit comprises a multi-wavelength integrated light source configured to generate a plurality of optical carriers for the plurality of radio frequency units, a first optical carrier of the plurality of optical carriers being modulated with downlink data from the baseband unit;

a first radio frequency unit of the plurality of the plurality of radio frequency units is configured to receive the first optical carrier of the plurality of optical carriers, and send a first uplink optical signal to the baseband unit, wherein the first radio frequency unit comprises:

a power splitter, configured to split the first optical carrier into a first part of the first optical carrier to a photoelectric detector for downlink data reception and a second part of the first optical carrier to a modulator for uplink data modulation;

the modulator, configured to modulate uplink data of the first radio frequency unit to the second part of the first optical carrier to obtain the first uplink optical signal.

5. The system of claim 4, wherein the multi-wavelength integrated light source is configured to generate at least two optical carriers for each of the plurality of optical carriers, the at least two optical carriers including an optical carrier for downlink data modulation and an optical carrier for uplink data modulation.

6. The system of claim 5, wherein the baseband unit comprises;

a multiplexer/demultiplexer, configured to multiplex optical signals over the plurality of optical carriers to obtain a combined optical signal, the optical signals including a first part of optical signals modulated with downlink data and a second part of optical signals without downlink data modulated; and an optical circulator, configured to receive a combined uplink optical signal from a same fiber of that for transmitting the combined downlink optical signal.

7. The system of claim 4, wherein the modulator is configured to amplify the second part of the first optical carrier and erase the downlink data in the second part of the first carrier before modulating the uplink data.

* * * * *